(12) United States Patent
Soliman

(10) Patent No.: US 6,429,815 B1
(45) Date of Patent: Aug. 6, 2002

(54) METHOD AND APPARATUS FOR DETERMINING SEARCH CENTER AND SIZE IN SEARCHES FOR GPS TRANSMISSIONS

(75) Inventor: Samir S. Soliman, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/430,619

(22) Filed: Oct. 29, 1999

Related U.S. Application Data

(63) Continuation-in-part of application No. 09/040,501, filed on Mar. 17, 1998, now Pat. No. 6,081,229.

(51) Int. Cl.[7] .............................................. H04B 7/185
(52) U.S. Cl. .............................. 342/357.15; 342/357.06
(58) Field of Search ........................ 342/357.06, 357.15, 342/357.1; 701/213

(56) References Cited

U.S. PATENT DOCUMENTS

| | | | | |
|---|---|---|---|---|
| 6,078,290 A | * | 6/2000 | McBurney et al. | 342/417 |
| 6,081,229 A | * | 6/2000 | Soliman et al. | 342/357.05 |
| 6,101,175 A | * | 8/2000 | Schorman et al. | 370/331 |
| 6,161,022 A | * | 12/2000 | Hwang et al. | 455/561 |
| 6,188,354 B1 | * | 2/2001 | Soliman et al. | 342/387 |

* cited by examiner

*Primary Examiner*—Dao Phan
(74) *Attorney, Agent, or Firm*—Philip Wadsworth; Charles D. Brown; Kevin T. Cheatham

(57) ABSTRACT

A system and method for determining the size and center of a search for global positioning system (GPS) satellites. The system and method uses information taken from a wireless communication device for which the location is sought. The information includes determinations as to what communication base stations are local to the wireless communication device and how far away each such base station is from the wireless communication system.

4 Claims, 14 Drawing Sheets

US 6,429,815 B1

METHOD AND APPARATUS FOR DETERMINING SEARCH CENTER AND SIZE IN SEARCHES FOR GPS TRANSMISSIONS

RELATED APPLICATIONS

The present application is a continuation-in-part of U.S. patent application Ser. No. 09/040,501, entitled "System and Method for Determining the Position of a Wireless CDMA Transceiver", filed on Mar. 17, 1998, now U.S. Pat. No. 6,081,229.

BACKGROUND OF THE INVENTION

1. Field of the Invention

The present invention relates to communications systems. More specifically, the present invention relates to systems and techniques for locating the position of a wireless communication device in a code division multiple access system.

2. Description of the Related Art

Deployment of location technologies in wireless networks is being driven by regulatory forces and carriers' desires to enhance revenues by differentiating the services offered by one carrier from the services offered by others. In addition, in June 1996, the Federal Communications Commission (FCC) mandated support for enhanced emergency 911 (E-911) service. Phase I of the Order requires that sector and cell information be set back to the PSAP (Public Safety Answering Point) agency. Phase II of the Order requires that the location of the cellular transceiver be sent back to the PSAP. To comply with the FCC mandate, 77,000 total sites are to be equipped with automatic location technologies by the year 2005.

Many techniques are being considered to provide automatic location capability. One technique being considered involves measuring the time difference of arrival of signals from a number of cell sites. These signals are triangulated to extract location information. Unfortunately, this technique requires a high concentration of cell sites and/or an increase in the transmission power of the sites to be effective. This is due to the fact that in a typical CDMA system, each telephone transmits with only enough signal power to reach the closest cell site. As triangulation requires communication with at least three sites, the concentration of cell sites would have to be increased or the signal power of each wireless communication device would have to be increased.

In any event, each alternative has significant drawbacks. An increase in the number of cell sites would be too costly. Increases in signal power would add to the weight and cost of each wireless communication device and increase the likelihood of interference between wireless users. In addition, the network triangulation approach does not appear to meet the FCC mandate requirements.

Another approach being considered involves the addition of GPS (Global Positioning System) functionality to the cellular telephone. Although this approach would add significant cost and weight to the wireless communication device, require a line-of-sight to four satellites, and would be somewhat slow, nevertheless, it is the most accurate approach to support location services.

To speed the process, a third approach sends aiding information to the wireless communication device indicating where the wireless communication device should look in frequency for GPS carriers. Most GPS receivers use what is known as a GPS satellite almanac to minimize a search performed by the receiver in the frequency domain for a signal from a visible satellite. The almanac is a 15,000 bit block of coarse ephemeris and time model data for the entire constellation. The information in the almanac regarding the position of the satellite and the current time of day is approximate only. Without an almanac, the GPS receiver must conduct the widest possible frequency search to acquire a satellite signal. Additional processing is required to attain additional information that will aid in acquiring other satellites.

The signal acquisition process can take several minutes due to the large number of frequency bins that need to be searched. Each frequency bin has a center frequency and predefined width. The availability of the almanac reduces the uncertainty in satellite Doppler and therefore the number of bins that must be searched.

The satellite almanac can be extracted from the GPS navigation message or sent on the down (forward) link as a data or signaling message to the receiver. Upon receipt of this information, the receiver performs GPS signal processing to determine its location. While this approach may be somewhat faster, it suffers from the requirement of a line-of-sight to at least four satellites. This may be problematic in urban environments.

Hence, a need remains in the art for a fast, accurate and inexpensive system or technique for locating a cellular.

SUMMARY OF THE INVENTION

The need in the art is addressed by the system and method presently disclosed for determining the position of a wireless transceiver. In the most general sense, the inventive method is a hybrid approach for determining position using ranging information from a terrestrial system, timing information from a wireless communication device, and ranging information from GPS satellites. This information is combined to allow the position of a wireless communication device to rapidly and reliably determined. The disclosed method includes the steps of receiving at a wireless communication device, a first signal transmitted from a first GPS satellite, a second signal transmitted from a second GPS satellite, and a third signal form a third satellite. The wireless communication device is adapted to receive these GPS signals and transmit a fourth signal to the base station in response thereto. The base station receives the fourth signal, corrects for the clock bias imposed on the fourth signal by the round trip delay between the base station and the wireless communication device and uses the unbiased fourth signal to calculate the position of the wireless communication device.

In a specific implementation, the base station sends aiding information to the wireless communication device. The aiding information is used by the wireless communication device to quickly acquire the signals transmitted by the first, second and third satellites. The aiding signals are derived from information collected at the base station transceiver subsystem (BTS) serving the wireless communication device, Base Station Controller (BSC), or some other entity and includes: (1) satellite identification information; (2) Doppler shift or related information; (3) values indicating the distance between the base station and each satellite; and (4) a search window size associated with each satellite, the search window size being calculated based on the round trip delay between the wireless communication device and the base station and the elevation angle of each satellite.

Upon acquisition by the wireless communication device of the signals transmitted by the first, second and third satellites, the wireless communication device calculates the range pm1, between the wireless communication device and the first satellite, range pm2 between the wireless communication device and the second satellite, and range pm3 between the wireless communication device and the third satellite. This range information is transmitted back to the base station along with information as to the time at which the measurement was made. In a CDMA implementation, the time it takes the signal to propagate between the base station antenna and the wireless communication device antenna is half the round trip delay and is known by the base station. A measure of the round trip delay between the wireless communication device and the base station indicates the distance between the wireless communication device and the base station. In addition, this delay provides a means for correcting the wireless communication device absolute time.

A device external to the wireless communication device, such as the base station controller or some other entity associated with the cellular infrastructure, utilizes information known to the serving base station to calculate the position of the wireless communication device. Such information may include the position of the first, second, and third satellites relative to the wireless communication device and the distance between the wireless communication device and the base station. Determining the position of the wireless communication device is achieved by finding: (1) an intersection of a first sphere of radius cp1 around a first satellite, (2) a second sphere of radii cp2 around the second satellite, (3) a third sphere of radii cp3 around the third satellite, and (4) a fourth sphere of radius cpb around the base station. "c" is the speed of light, "p1" is the pseudo-range associated with the first satellite and the wireless communication device, "p2 " is the pseudo-range associated with the second satellite and the wireless communication device, "p3 " is the pseudo-range associated with the third satellite and the wireless communication device, and "cpb" is the pseudo-range associated with the base station and the wireless communication device.

Note that if a line-of-sight (no multipath) exists between the wireless communication device and the base station, then the proposed approach requires measurements from only two satellites and one base station. In the case of a communication system that is synchronized to GPS time, such as a CDMA communication system, the pseudo-range measurement taken from the signals transmitted by the base station will be used both to remove the bias from the satellite pseudo-range measurements and as an additional ranging measurement. Additional information from another base station, if available, can be used to further reduce the number of satellites required to determine the position of the wireless communication device. Also in situations, where only two-dimensional locations are needed, only one satellite and one base station are needed.

One key advantage of this approach over other known GPS approaches is the speed with which the wireless communication device can determine the pseudo-range. Since the serving base station transceiver, base station controller, or other entity coupled to the base station has its own GPS receiver, and also knows the pseudo-ranges of all satellites being tracked with respect to the serving base station location, it is possible to determine a search window center and search window size for each satellite being tracked. The information is sent to the wireless communication device to increase the speed of the search process.

That is, a clock onboard each GPS satellite controls the timing of the broadcast of the ranging signal by the satellite. Each such clock is synchronized to GPS system time. The base station also contains a clock that is synchronized to GPS system time. The wireless communication device synchronizes its clock to GPS time with a delay corresponding to the one-way delay between the base station and the wireless communication device. Timing information is embedded within the satellite ranging signal that enables the wireless communication device to calculate when the signal was transmitted from a specific satellite. By recording the time when the signal was received, the distance (range) from the satellite to the wireless communication device can be computed. As a result, the locus of the location of the wireless communication device is a sphere with center at the satellite location and radius equal to the calculated range. If a measurement is simultaneously made using the ranging of two other satellites, the wireless communication device would be somewhere on the surface of three spheres. The three spheres intersects in two points, however, only one of the points is the correct wireless user position. The candidate locations are mirror images of one another with respect to the plane containing the three satellites.

In one embodiment of the disclosed method and apparatus, the GPS satellites for locating the position of the wireless communication device at a given point in time are identified by the base station. This information is forwarded to the wireless communication device to facilitate the search operation performed by the wireless communication device.

In addition to the above, when the wireless communication device is a Code Division Multiple Access (CDMA) receiver, the presently disclosed method and apparatus takes advantage of the fact that CDMA is a synchronous system. Being synchronous, the time of arrival of a reference pilot at the wireless communication device can be used as a time reference. Accordingly, the wireless communication device can measure the time difference of arrival between the reference pilot, GPS signals, and other pilot signals. Accordingly, the problem of determining the location of the wireless communication device becomes a time difference of arrival (TDOA) problem, resulting in a further reduction in the number of satellites required to determine the location of the wireless communication device.

In one embodiment, the wireless communication device can have several modes of operation:

(1) Hybrid mode using information from both the wireless system infrastructure and the GPS satellites;

(2) Stand-alone (standard or conventional) GPS mode;

(3) Aided stand-alone GPS mode;

(4) Inverted differential GPS mode; and (5) Aided and inverted differential GPS mode.

DETAILED DESCRIPTION OF THE INVENTION

Illustrative embodiments will now be described with reference to the accompanying drawings.

While the present method and apparatus is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

Figure 1:
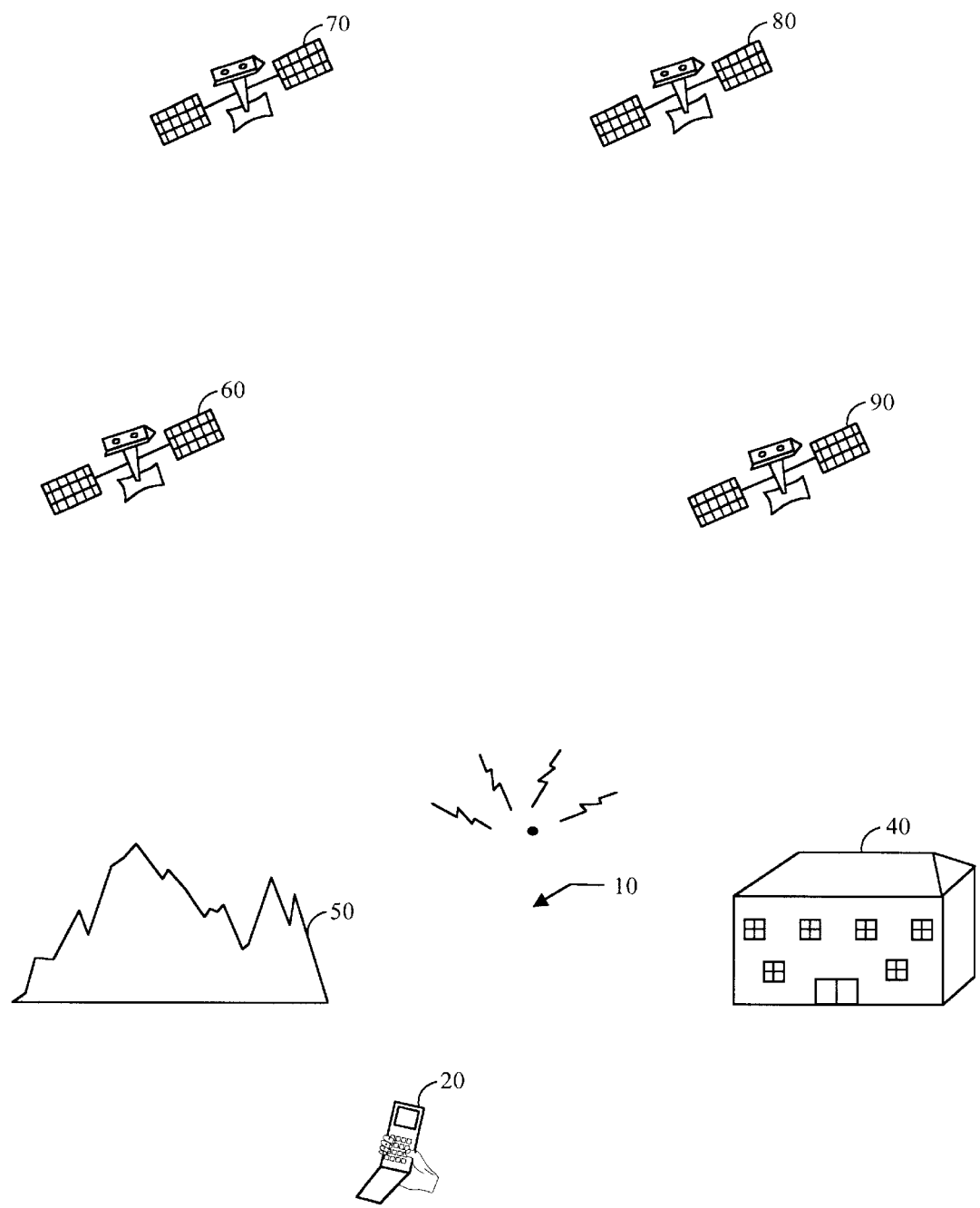
FIG. 1 is a diagram showing an illustrative implementation of a base station and wireless communication device of a wireless (CDMA) communication system.

FIG. 1 is a diagram showing an illustrative implementation of a wireless communication device 20 and an external signal source, such as a base station 10 or satellite 60, 70, 80, 90, of a wireless code division multiple access (CDMA) communication system. The communication system is surrounded by buildings 40 and ground based obstacles 50. The base station 10 and wireless communication device 20 are disposed in a GPS (Global Positioning System) environment having several GPS satellites, of which four are shown 60, 70, 80 and 90. Such GPS environments are well known. See for example Hofmann-Wellenhof, B., et al., GPS Theory and Practice, Second Edition, New York, N.Y.: Springer-Verlag Wien, 1993. Those of ordinary skill in the art will appreciate that the present teachings may be applied to other communication systems, such as advanced mobile phone system (AMPS), Global system for mobile communications (GSM), etc. without departing from the scope of the present invention.

In a typical GPS application, at least four satellites are required in order for a GPS receiver to determine its position. In contrast, the presently disclosed method and apparatus is for determining the three-dimensional position of a wireless communication device 20 using only three GPS satellites, the round trip delay from the wireless communication device to an external signal source, such as the serving base station 10, and the known location of the serving base station 10. In cases where there is a direct line-of-sight available, only two GPS satellites, round trip delay, and the known location of the serving base station 10 are required to locate a wireless communication device 20. This number can be reduced even further by using time difference of arrival information from the forward link of a CDMA cellular communication system or from any other synchronous cellular communication system. For the purpose of this disclosure, a cellular communication system is defined as a communication system in which multiple cells are used to allow a wireless communication device to receive signals from the communication system from at least one of the plurality of cells as the wireless communication device moves about within the system.

Figure 2A:
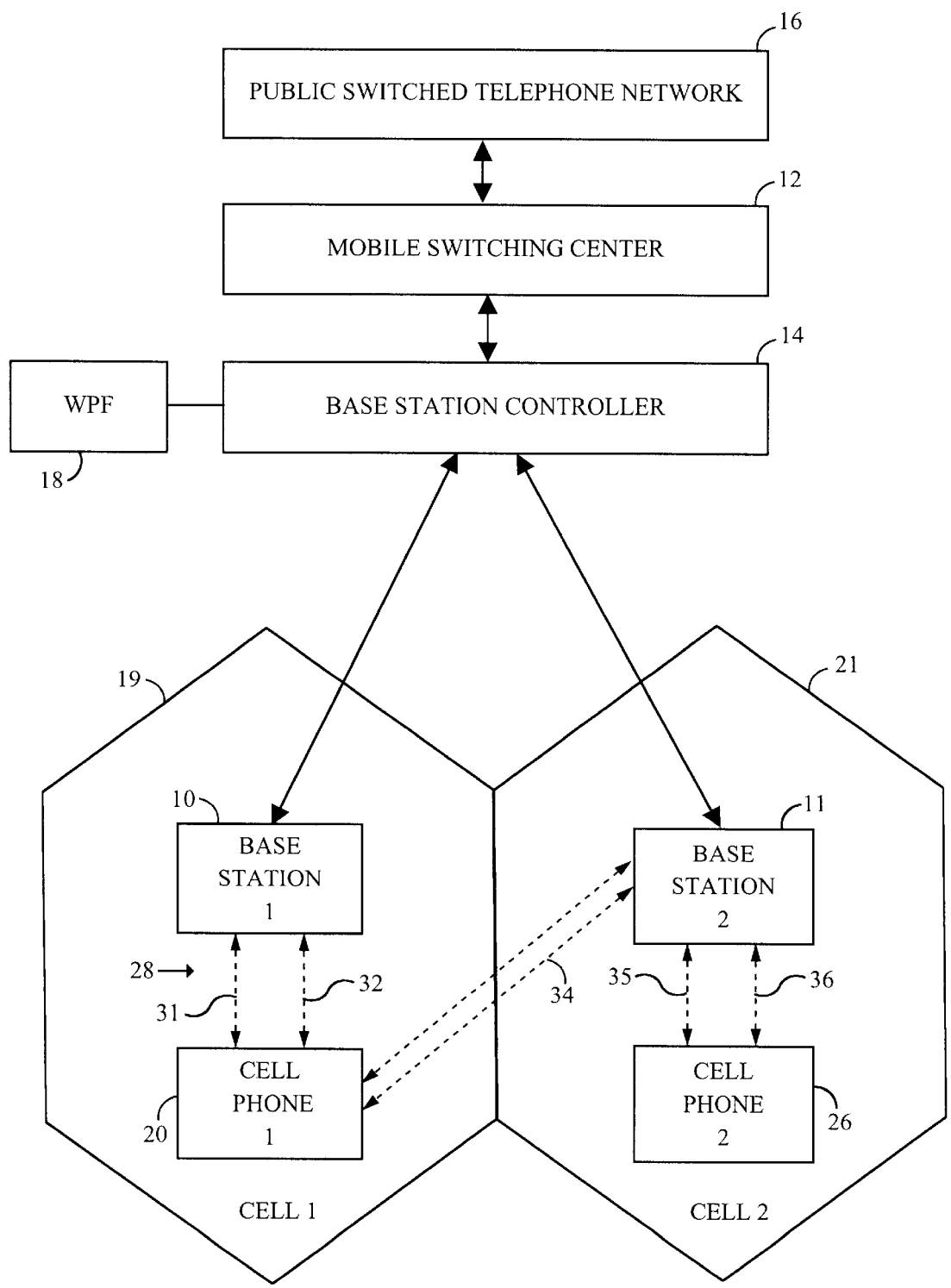
FIG. 2a is a block diagram of an exemplary CDMA cellular telephone system.

FIG. 2a is a block diagram of a CDMA cellular telephone system 30. The system 30 includes a mobile switching center (MSC) 12 having a base station controller (BSC) 14. A public switched telephone network (PSTN) 16 routes calls from telephone lines and other networks (not shown) to and from the MSC 12. The MSC 12 routes calls from the PSTN 16 to and from a source base station 10 associated with a first cell 19 and a target base station 11 associated with a second cell 21. In addition, the MSC 12 routes calls between the base stations 10, 11. The source base station 10 directs calls to the first wireless communication device 20 within the first cell 19 via a first communications path 28. The communications path 28 is a two-way link having a forward link 31 and a reverse link 32. Typically, when the base station 10 has established voice communications with the wireless communication device 20, the link 28 includes a traffic channel. Although each base station 10, 11 is associated with only one cell, a base station controller often governs or is associated with base stations in several cells.

When the wireless communication device 20 moves from the first cell 19 to the second cell 21, the wireless communication device 20 begins communicating with the base station associated with the second cell. This is commonly referred to as a "hand-off" to the target base station 11. In a "soft" handoff, the wireless communication device 20 establishes a second communications link 34 with the target base station 11 in addition to the first communications link 28 with the source base station 10. After the wireless communication device 20 crosses into the second cell 21 and the link with the second cell has been established, the wireless communication device may drop the first communications link 28.

In a hard handoff, the operation of the source and target base stations typically are different enough that the communications link 34 between the source base station must be dropped before the link to the target base station can be established. For example, when a source base station is within a CDMA system using a first frequency band and target base station is in a second CDMA system using a second frequency band, the wireless communication device will not be able to maintain links to both base stations concurrently, since most wireless communication devices do not have the ability to tune to two different frequency bands concurrently (one transmission frequency band and one receive frequency band). When the first wireless communication device 20 moves from the first cell 19 to the second cell 21, the link 28 to the source base station 10 is dropped and a new link is formed with the target base station 11.

Figure 2B:
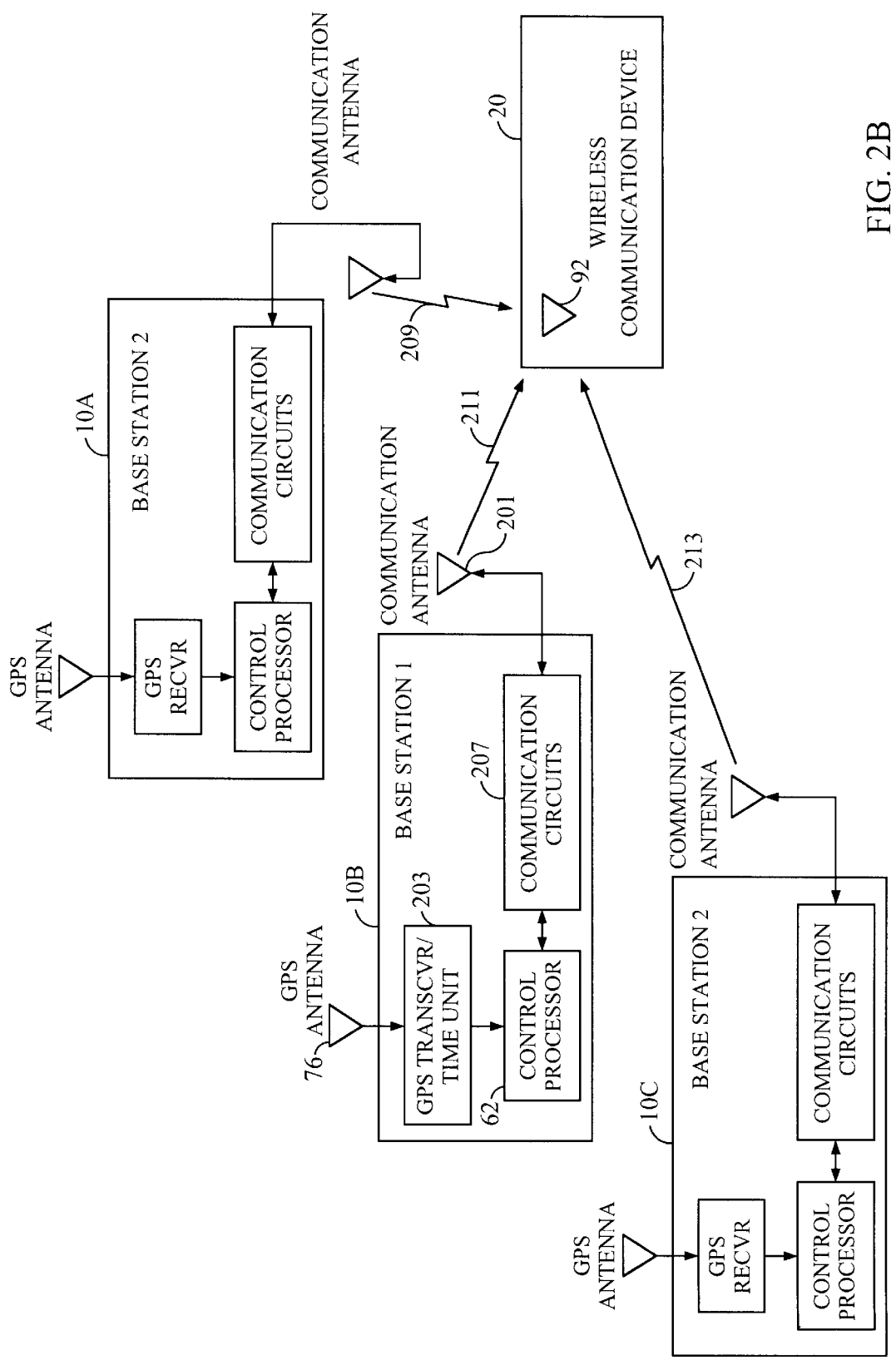
FIG. 2b is a simplified representation of a first, second, and third base station, and a wireless communication device.
Figure 3:
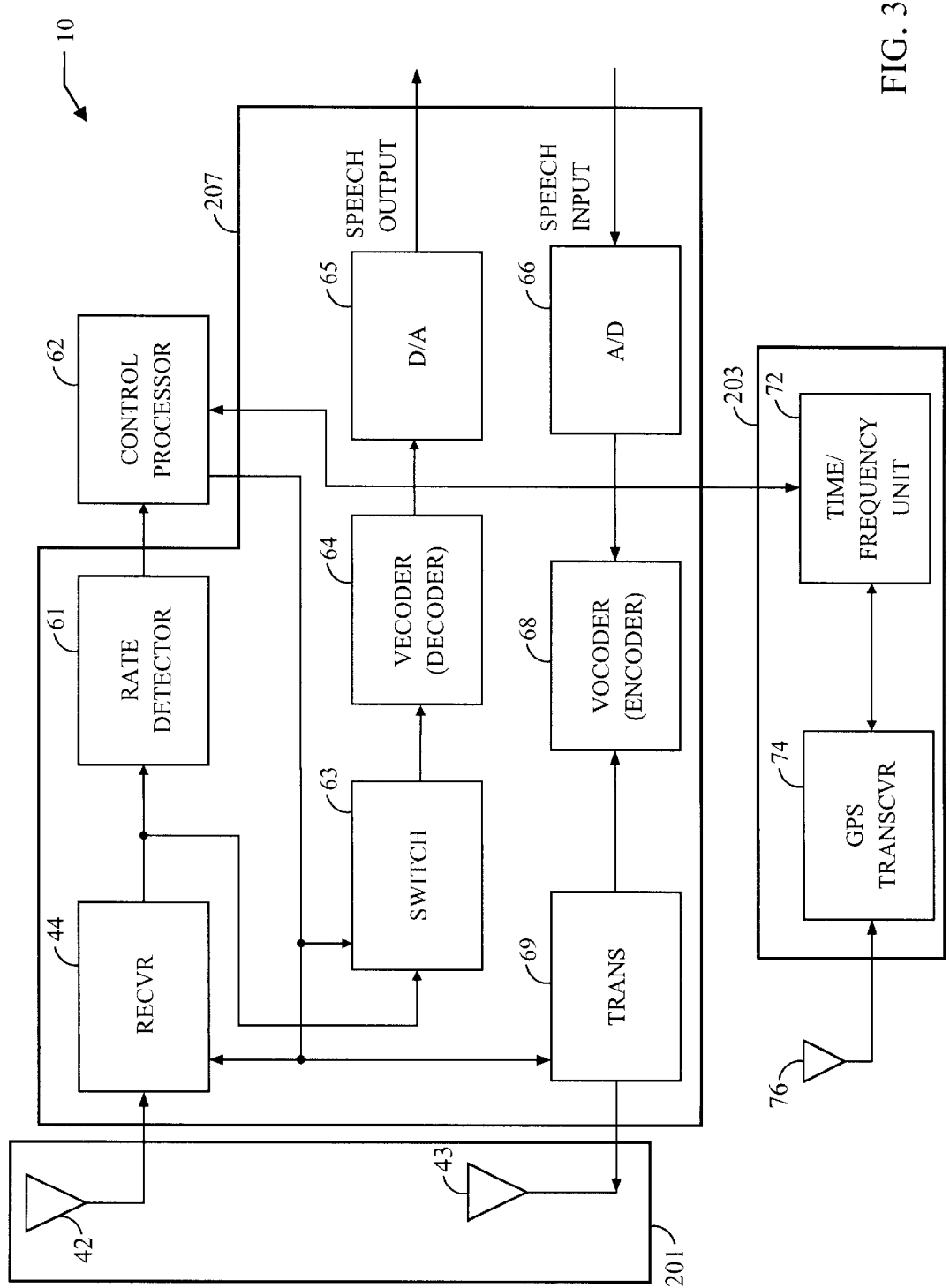
FIG. 3 is an illustrative simplified representation of a base station constructed in accordance with the teachings of the present invention.

FIG. 2b is a simplified representation of a first, second, and third base station 10a, 10b, 10c, and a wireless communication device 20. As shown in FIG. 2b, each base station comprises: a GPS transceiver/time unit 203; processing circuitry, such as a control processor 62; a GPS antenna 76, communication circuits 207; and communication antennas 201. It will be understood by those skilled in the art that the control processing circuitry may be a general purpose computer, a microprocessor, micro-computer, dedicated state machine, dedicated discrete hardware circuitry, application specific integrated circuit (ASIC), or any other circuitry that allows the functions described as being performed by the control processor to be performed. FIG. 3 is more detailed representation of a base station 10 constructed in accordance with the teachings of the presently disclosed method and apparatus and will now be discussed. In accordance with the embodiment shown in FIGS. 3 and D, the base station 10 is essentially conventional. In an alternative embodiment, the base station 10 includes additional functionality which allows the base station to determine the position of a wireless communication device 20, as will become clear from the description provided below. The communication antennas 201 include a receive CDMA antenna 42 for receiving CDMA signals and a transmit CDMA antenna for transmitting CDMA signals. Signals received by the antenna 42 are routed to the communication circuits 207. The communication circuits 207 include: a communications receiver 44, a rate detector 61, a switch 63, a vocoder 64, an digital to analog (D/A) convertor 65, a transmitter 69, a vocoder 68, and an analog to digital (A/D) convertor 66. The receiver 44 receives signals directly from the antenna 42. In practice, the receiver 44 includes demodulators, de-interleavers, decoders and other circuits as will be appreciated by those skilled in the art. The received signal is allocated to an appropriate channel for which a rate detector 60 is associated. The control processor 62 uses the rate of the detected signal to detect speech. If speech is detected in a received frame, the control processor 62 switches the received frame to the vocoder 64 via a switch 63. The vocoder 64 decodes the variable rate encoded signal and provides a digitized output signal in response thereto. The digitized de-vocoded signal is converted to speech by the D/A converter 65 and an output device such as a speaker (not shown).

Input speech from a microphone or other input device (not shown) is digitized by the A/D converter 66 and vocoded by the vocoder encoder 68. The vocoded speech is input to the transmitter 69. In practice, the transmitter 69 includes modulators, interleavers and encoders as will be appreciated by those skilled in the art. The output of the transmitter 69 is fed to the transmit antenna 43.

As shown in FIG. 3, the GPS transceiver/time unit 203 includes a receiver 74, and a timing and frequency unit 72. The timing and frequency unit 72 accepts-signals from the GPS engine of the GPS receiver 74 and uses the signals to generate timing and frequency references for the proper operation of the CDMA system. Accordingly, in many such CDMA systems, each cell site is synchronized to GPS time (i.e., uses a GPS time base reference from which time critical CDMA transmissions (including pilot PN sequences, frames and Walsh functions) are derived). Such conventional timing and frequency units and GPS engines are common in CDMA systems and are well known in the art. Conventional timing and frequency units provide frequency pulses and timing information. In contrast, the timing and frequency unit 72 of the presently disclosed method and apparatus preferably also outputs the elevation angle, pseudo range, satellite identification (i.e., pseudo noise (PN) offset associated with each satellite) and information related to the Doppler shift associated with each satellite in order to assist the wireless communication device 20 in acquiring the satellites (i.e., decrease the amount of time required to acquire a satellite). This information is typically available within conventional timing and frequency units, but is typically neither needed nor provided to external devices. The additional information provided by the timing and frequency unit 72 is preferably communicated to the BSC 14 in the same manner as is conventionally done with regard to frequency and timing information in a conventional base station.

Figure 4:
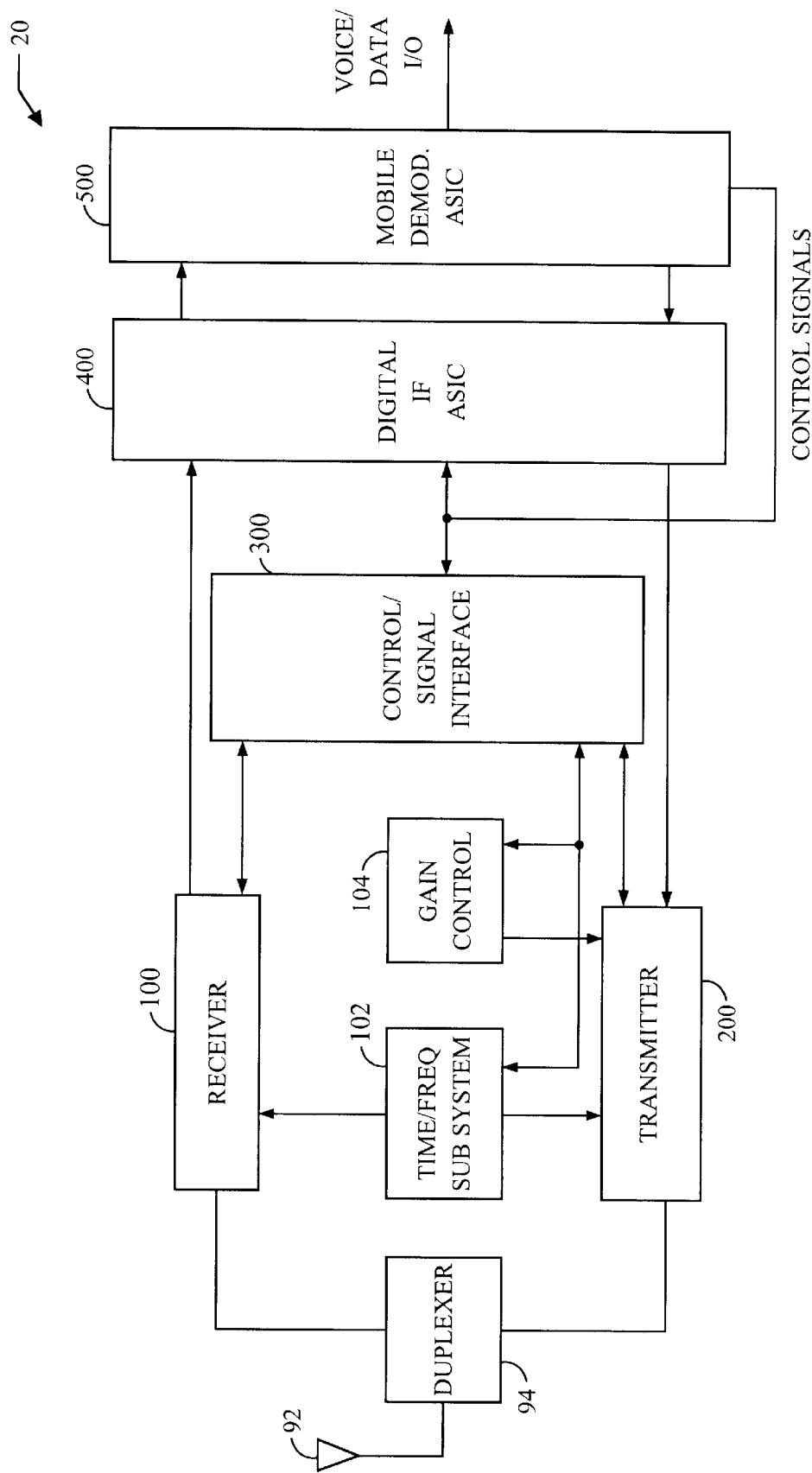
FIG. 4 is a block diagram of the wireless communication device of the system for determining the position of a wireless CDMA transceiver of the present invention.

FIG. 4 is a block diagram of the wireless communication device 20 in accordance with one embodiment of the disclosed method and apparatus. The wireless communication device 20 preferably includes a bidirectional antenna 92 adapted to receive CDMA transmissions well as GPS signals. In an alternative embodiment of the disclosed method and apparatus, separate antennas may be used for receiving and transmitting GPS signals, CDMA signals, and other signals, such as alternative system signals. The antenna 92 preferably feeds a duplexer 94. The duplexer 94 preferably feeds a receiver 100 and is preferably fed by a transmitter 200. A time frequency subsystem 102 provides analog and digital reference signals for the receiver 100, a control signal interface 300, and the transmitter 200, as will be appreciated by those skilled in the art. CDMA power control is provided by a gain control circuit 104. In one embodiment of the disclosed method and apparatus, the control signal interface 300 is a digital signal processor (DSP). Alternatively, the control signal interface may be another circuit capable of performing gain control functions. The control signal interface 300 provides control signals for the wireless communication device 20. The receiver 100 provides for radio frequency (RF) down conversion and a first stage of intermediate frequency (IF) down conversion. A digital IF application specific integrated circuit (ASIC) 400 provides for a second stage of IF to baseband down conversion, sampling and analog to digital (A/D) conversion. A mobile demodulator ASIC 500 searches and correlates digital baseband data from the digital IF ASIC 400 to ascertain pseudo-ranges as discussed more fully below.

The pseudo-ranges, along with any voice or data, is passed by the mobile demodulator 500 to the digital IF modulator 400. The digital IF modulator 400 provides a first stage IF up conversion of the data received from the mobile demodulator 500. A second stage of IF up conversion and RF up conversion of these signals is provided by the transmitter circuit 200. These signals are then transmitted to the base station 10 and processed in accordance with the method of the invention discussed below. It should be noted that location information to be communicated between the wireless communication device 20 and the BSC 14, such as pseudo-ranges received by the wireless communication device 20, are preferably communicated by the wireless communication device 20 to the base station 10 via a data burst type message, such as short message service (SMS) defined by industry standard TIA/EIA/IS-167, published by the Telecommunications Industry Association/Electronics Industry Association (TIA/EIA). Such messages are transmitted through the base station 10 to the BSC 14. Alternatively, a newly defined burst type message could be transmitted by the wireless communication device 20 to the base station 10.

Figure 5:
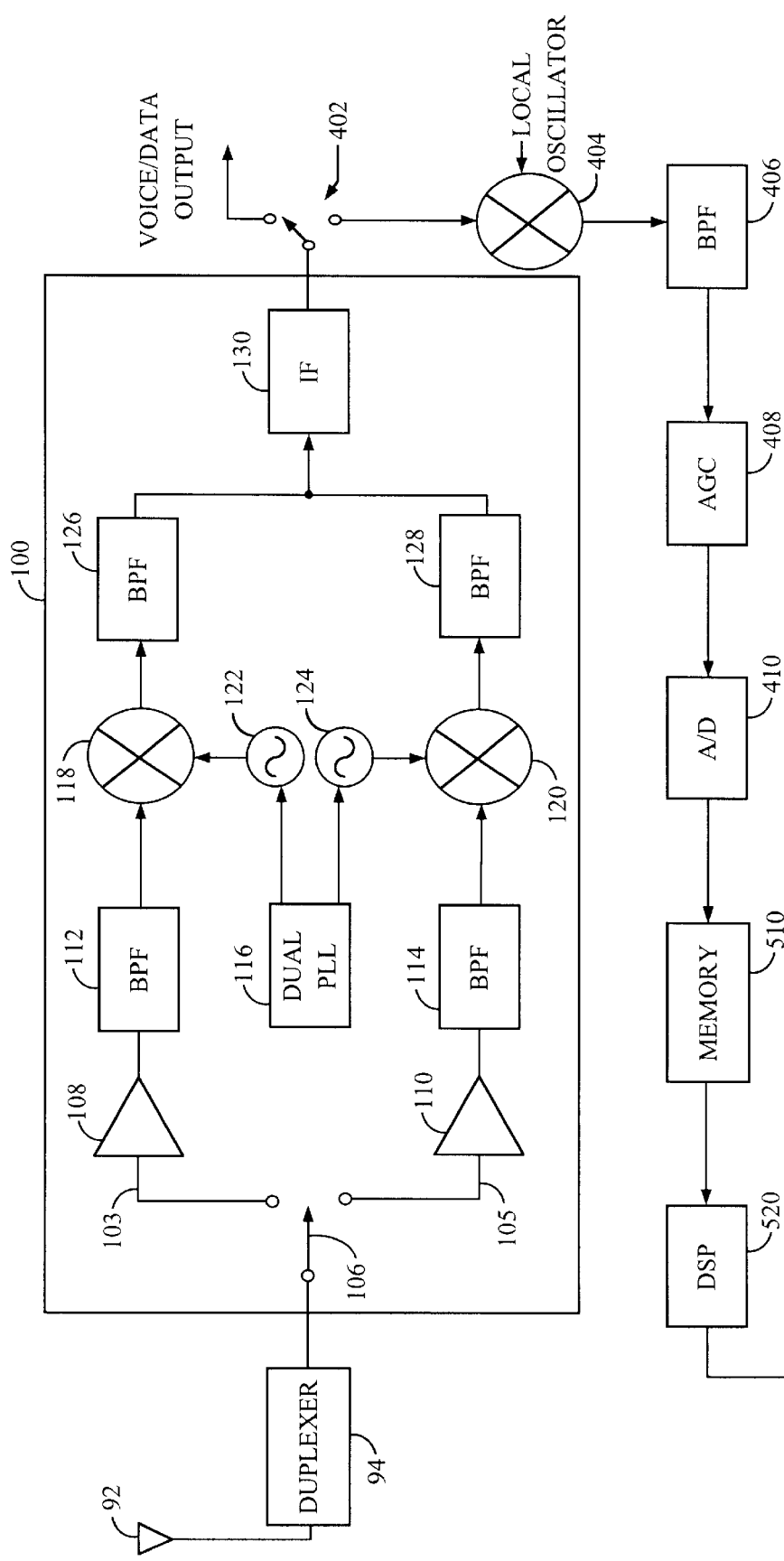
FIG. 5 is a block diagram of an illustrative implementation of a portion of the receiver, control signal interface, digital IF, and wireless demodulator circuits of the wireless communication device of the present invention.

FIG. 5 is a block diagram of an illustrative implementation of a portion of the receiver, control signal interface, digital IF, and mobile demodulator circuits of the wireless communication device 20 of the disclosed method and apparatus. The transmitter portion of the wireless communication device 20 is essentially identical to the transmitter portion of a conventional wireless communication device and therefore is not discussed herein for the sake of brevity.

In the preferred embodiment, the receiver 100 is implemented with first and second paths 103 and 105, respectively, which are connected to the antenna 92 via the duplexer 94 and a first switch 106. It will be understood by those skilled in the art that more integration between the two-way communication device and the GPS receiver could take place. Alternatively, two separate receivers with an appropriate interface could achieve the objective of the disclosed method and apparatus.

The first path 103 downconverts received CDMA signals and provides conventional CDMA RF downconverted output signals. The first path 103 includes a low noise amplifier 108, a first bandpass filter 112, a first mixer 118 and a second bandpass filter 126. The second path 105 downconverts GPS signals from the GPS satellites 60, 70, 80 or 90 of FIG. 1. The second path 105 includes a second low noise amplifier 110 which feeds a third bandpass filter 114. The output of the bandpass filter 114 is input to a second mixer 120. The output of the second mixer is fed to a fourth bandpass filter 128. The first and second mixers are fed by first and second local oscillators 122 and 124, respectively. The first and second local oscillators 122 and 124 operate at different frequencies under control of a dual phase locked loop (PLL) 116. The dual PLL insures that each local oscillator 122 and 124 maintains a reference frequency effective to down convert either a received CDMA signal, in the case of the first mixer 118, or a received GPS signal, in the case of the second mixer 120. The outputs of the second and fourth bandpass filters 126 and 128 are coupled to a first IF section 130 of conventional design.

The output of the IF demodulator 130 is input to a second switch 402 in the digital IF ASIC 400. The first and second switches 106 and 402 operate under control of the control signal interface 300 to divert a received signal for voice or data output processing in a conventional CDMA manner or GPS processing by a third mixer 404, fifth bandpass filter 406, an automatic gain control circuit 408 and an A/D converter 410. The second input to the third mixer 404 is a local oscillator output. The mixer 404 converts the applied signal to baseband. The filtered, gain controlled, signal is fed to the A/D converter 410. The output of the A/D converter 410 includes a first digital stream of in-phase (I) components and a second digital stream of quadrature components (Q). These digitized signals are fed to a digital signal processor 520, which processes the GPS signal and outputs the pseudo-range information required for position determination.

In an alternative embodiment of the disclosed method and apparatus, the outputs from the two bandpass filters 126, 128 are fed to a baseband application specific integrated circuit (ASIC) which digitally converts the IF frequency signals output from the baseband filters 126, 128 to baseband and outputs a stream of digital values that represent the quadrature and in-phase baseband signals. These signals are then applied to a searcher. The searcher is essentially identical to conventional searches used in CDMA demodulators. However, the searcher that is preferably used is programmable to allow the searcher to search for either a PN code associated with the CDMA signals transmitted from the base station or the PN code associated with the GPS satellites. The searcher discriminates between CDMA channels when receiving CDMA signals from the base station and determines the GPS satellite from which received GPS signals are being transmitted when in the GPS mode. In addition, once the GPS signals are acquired, the searcher indicates the time offset associated with the PN code essentially in a conventional manner in order to determine the pseudo range associated with satellites from which signals are being received, as will be understood by those skilled in the art.

It will be understood by those skilled in the art that a double conversion process, such as is shown in FIG. 5, or alternatively, a single conversion and IF sampling technique, or a direct conversion could be used to produce the required I and Q samples. Furthermore, the structure of the embodiment shown in FIG. 5 may be altered in many ways that would not affect the operation of the disclosed method and apparatus. For example, a conventional programmable processor may be used in place of the DSP that is shown in FIG. 5. The memory 510 may not be required if the rate at which data flows through the system is such that no buffers are required. The bandpass filter 406 and automatic gain control circuit 408 may be omitted under certain conditions, implemented using digital techniques or analog techniques, or other wise altered. Many other such variations to the structure that is shown in FIG. 5 may be made without altering the invention. Furthermore, it should be noted that an alternative embodiment may have greater or lesser sharing of hardware and software resources between the GPS and wireless receiver.

Figure 6:
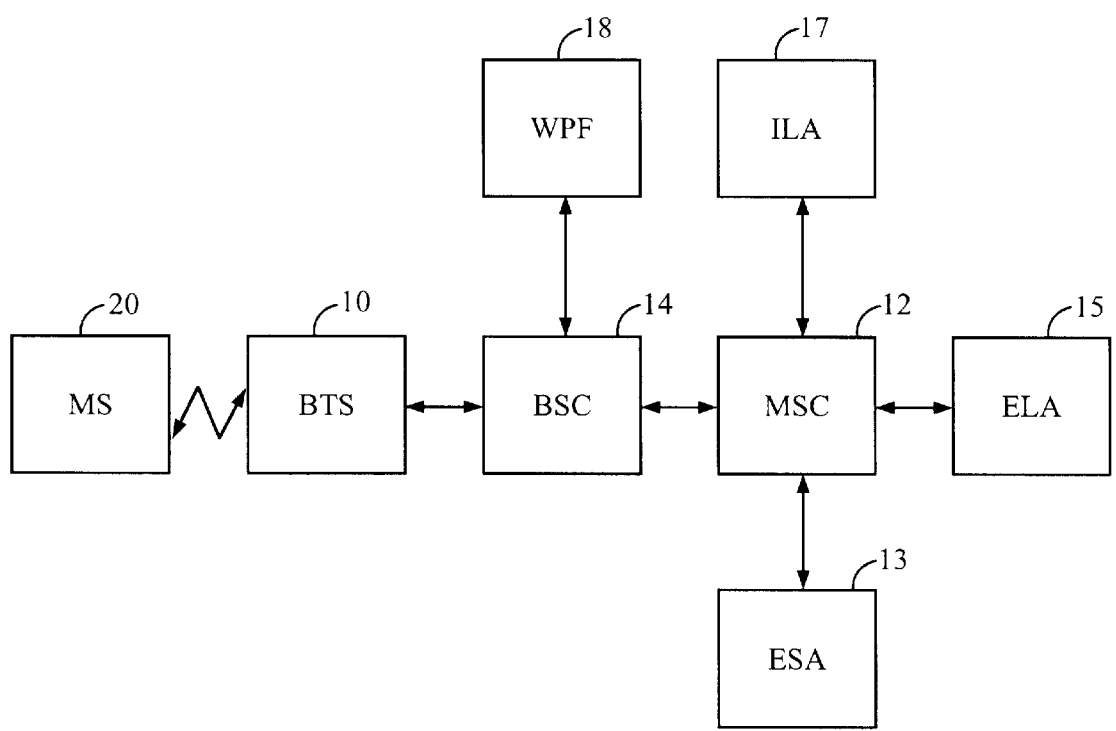
FIG. 6 is an illustration of a functional model for determining the location of a wireless communication device.

FIG. 6 is a high level block diagram of the components of a communication system which includes the disclosed method and apparatus. In operation, in accordance with the disclosed method, the BSC 14 requests GPS information from the control processor 62 (FIG. 3) within the base station 10. This information includes, but is not limited to, all of the satellites currently being viewed by the GPS transceiver 74 (FIG. 3), their elevation angle, Doppler shift, and pseudo ranges at a specific time. Note that the GPS receiver at the base station 10 has up-to-date information on the location, frequency, and PN offset of each satellite in view, because it is always tracking all satellites that are in view. Alternatively, the base station 10 could send data corresponding to a subset of only those satellites that can be viewed by the wireless communication device 20, assuming that the base station 10 has stored information regarding the street width and height of the surrounding buildings. That is, if the base station 10 has the ability to determine that the wireless communication device will have an obstructed view of one or more satellites, then the base station 10 will not send information regarding those satellites that are obstructed.

It should be noted that a conventional GPS receiver notes the time at which satellite signals are received with respect to the receiver's internal GPS clock. However, the receiver's internal GPS clock is not accurately synchronized to "true" GPS time. Therefore, the receiver cannot know the exact point in "true" GPS time at which the satellite signals are received. Later, a navigation algorithm corrects this error by using a fourth satellite. That is, if the clock within the receiver were accurately synchronized to the clock in each satellite, then a conventional GPS receiver would only require three satellites to accurately determine the position of the receiver. However, since the receiver clock is not accurately synchronized to the satellite's clock, additional information is required. This additional information is provided by noting the time at which a fourth satellite's signal is received by the receiver. This can be understood by noting that there are four equations (i.e., one equation associated with each of the four satellites) and four unknowns which must be solved (i.e., the x, y, and z coordinates of the receiver, and the error in the receiver clock). Therefore, for three-dimensional solutions, at least four measurements from four different satellites are required in a conventional GPS receiver.

In contrast, the present system utilizes an earth based station which is synchronized to true GPS time. In one embodiment, this station is a CDMA base station. It will be understood by those skilled in the art that CDMA base stations are synchronized to GPS time. In cases where the base is not perfectly synchronized, the time offset can be calibrated out. In addition, all wireless communication devices that communicate through such CDMA base stations using the CDMA protocol are also synchronized to an offset GPS time that is unique to each wireless communication device 20. The offset in time is equal to the "actual delay" in the communication of the signal (i.e., the "transmission delay" due to the one-way delay caused by the propagation of the radio signal from the base station antenna to the wireless communication device antenna, plus the internal delay caused by hardware delays in the transmission chain of the base station). This is due to the fact that the wireless communication device synchronizes its clock (within the time/frequency subsystem 102) by receiving an indication from the base station of the GPS time. However, by the time the indication arrives at the wireless communication device, the indication is in error by an amount equal to the actual delay encountered while the signal travels from the base station to the wireless communication device. This actual delay can be determined by measuring how long it takes a signal to make a round-trip between the base station and the wireless communication device. The one way delay will be equal to approximately half the round trip delay. Many ways for measuring the round trip delay are available to those skilled in the art.

In accordance with the disclosed method and apparatus, processing circuitry within the time/frequency subsystem 102 corrects the internal clock within the time/frequency subsystem to more accurately synchronize the wireless communication device to GPS time by accounting for the delay encountered by the signal transmitted between the base station 10 and the wireless communication device 20.

It should be noted that the processing that is performed within the wireless communication device 20 is shown to be divided among functional blocks in FIG. 4. However, the particular structure that is used to perform the processing functions may be a single processing circuit, or may be individual processing circuits that are functions that are grouped differently from the grouping shown in the present disclosure. Such alternative grouping of the functions within the hardware can be done without affecting the operation of the disclosed method and apparatus. That is, as will be understood by those skilled in the art, processing functions can be split or combined within various processing circuits throughout the wireless communication device 20 without significantly affecting the operation of the disclosed method and apparatus.

In addition, the distance between the base station 10 and the wireless communication device 20 can be used to assist in determining the location of the wireless communication device 20. Hence, in the case of direct line-of-sight (LOS) between the base station 10 and the wireless communication device 20, one needs only two satellite range measurements and one base station range measurement. In cases where there is no direct LOS between the serving base station and the wireless communication device, three satellite measurements and one round trip delay measurement are required to calculate a three-dimensional location. The extra satellite measurement is required to correct for the additional distance introduced by the additional delay caused by the multipath. The round trip delay is used to correct the clock error in the wireless communication device.

The system described herein allows the position of a valid CDMA wireless communication device to be determined at any time utilizing a Wireless Positioning Function (WPF) 18 (FIG. 6), as long as the wireless communication device 20 is within the radio coverage area of the CDMA network and as long as there is sufficient quality of service on the CDMA network. The WPF comprises an input and output port and processing circuitry. It will be understood by those skilled in the art that the processing circuitry may be a general purpose computer, a microprocessor, microcomputer, dedicated state machine, dedicated discrete hardware circuitry, application specific integrated circuit (ASIC), or any other circuitry that allows the functions described as being performed by the WPF to be performed.

The process of determining the position of a wireless communication device may be initiated by the wireless communication device 20, the network, or an external entity, such as an internal location application (ILA) 17, an external location application (ELA) 15, or an emergency service application (ESA) 13. Each of these components 13, 15, 17 may be either hardware or software which is capable of requesting and/or receiving location information. In one embodiment, the ILA 17 is a terminal coupled to the BSC 14 which allows an operator to directly request and receive location information regarding a wireless communication device 20. Alternatively, the ILA 17 is a software application executed by a processor within the MSC 12.

The WPF 18 is preferably a conventional programmable processor capable of accepting the raw data that is received from the wireless communication device and from the satellites (i.e., the pseudo ranges from two satellites, the distance from the wireless communication device to the base station and the time correction factor) and calculating the position of the wireless communication device. However, any device that is capable of receiving the information required to calculate the location of the wireless communication device 20 based on such received information and output this location determination may be used. For example, the WPF 18 may be implemented as an ASIC, a discrete logic circuit, a state machine, or a software application within another network device (such as the BSC 14). Furthermore, it should be understood that the WPF 18 may be located within the base station 10, the BSM 14, or elsewhere in the MSC 12. Preferably, the WPF 18 is a software application that is executed by a dedicated processor that is in communication with the BSC 14. Accordingly, the base station 10, the BSC 14, and the MSC 12 need not be significantly modified in order to implement the disclosed method and apparatus with conventional components. Alternatively, the WPF 18 is a software application that is executed by a processor within the BSC 14. The WPF 18 preferably communicates with the BSC 14 via a communication port similar to that used by conventional billing functions, management functions, home location register/ visitor location register functions, and other ancillary functions that are performed by processors that are coupled to conventional BSCs.

The algorithm used to calculate the position is provided in Parkinson, B. W., and Spilker, J. J., Editors, Global Positioning System: Theory and Applications, Volume. I, American Institute of Aeronautics and Astronautics Inc., Washington D.C., 1996. Additionally, it should be noted that Volume II teaches how to perform differential GPS correction. It will be understood by those skilled in the art that such correction may have to be performed by the WPF 18 in order to calculate the position of the wireless communication device accurately.

In accordance with one embodiment of the disclosed method and apparatus, a service provider can restrict positioning services based on several conditions, such as capability, security, service profiles, etc. Location services may support each, or some subset, of the following services:

(1) Wireless communication device originated request for positioning (WPF).

(2) Network originated request for positioning (NRP).

(3) Positioning allowed on a per service instance (PSI): The wireless communication device gives an external application a temporary allowance to position the unit for the purpose of delivering a specific service.

(4) Positioning with/without wireless communication device identification (PWI/PWO): will position all wireless communication devices in a defined geographical area. PWI will give the identity and the location of these units while PWO will only give their location.

(5) Positioning within a closed group (PCG): Allows for the creation of groups within which special rights for positioning can be determined (fleet management).

TABLE 1

Type of location services

| Initiator/Periodicity | On demand (single/multiple instances) | Periodically | Event trigger |
|---|---|---|---|
| Wireless communication device | WPF, PSI, PCG | WPF, PCG | WPF |
| Network | PWO | PWO | NRP/PWO |
| External | PWO, PWI, PCG, PSI | PWO, PWI, PCG | |

In accordance with one embodiment of the disclosed method and apparatus in which a wireless communication device 20 originates a request for the position of that wireless communication device 20 to be determined, the wireless communication device 20 sends a position request to the MSC 12. The MSC 12 validates the request to ensure that the wireless communication device 20 has subscribed to the type of service requested. The MSC 12 then sends a request to the serving BSC 14 to find the position of the wireless communication device 20. The BSC 14 asks the serving base station 10 for position aiding information. The serving base station 20 responds to the request by sending:

(1) a list of satellites in view, (2) their Doppler shift, (3) their rate of Doppler change, (4) their pseudo-ranges, (5) their elevation angles, (6) their Signal-to-Noise ratio (SNR), and (7) an indication from which the amount of delay encountered by a signal transmitted between the base station and the wireless communication device can be determined (e.g., Round Trip Delay (RTD) between the wireless communication device and the serving base station).

It should be noted that the indication that is used to determine the amount of delay encountered by a signal transmitted between the base station and the wireless communication device may be the round trip delay encountered in a round trip from the base station to the wireless communication device and back or from the wireless communication device to the base station and back. This calculation may be done by noting the time at which a signal is transmitted from the point of origin of the round trip, knowing the amount of time required to retransmit the signal at the far end of the trip, and noting the time at which the retransmitted signal is received. If the base station originates the signal and does the measurement of the round trip delay, then the base station can:

(1) transmit information from which the wireless communication device can compute the one way delay between the base station and the wireless communication device (such as the round trip delay), or (2) calculate the amount of delay in a one way trip from the base station to the wireless communication device (assuming that the either the turn around time is negligible between receipt of the signal at the wireless communication device or receiving information on the turn around time) and transmit the one way delay to the wireless communication device.

Likewise, if the wireless communication device originates the signal and does the measurement of round trip delay, then the wireless communication device can:

(1) calculate the one way delay directly from the measured round trip delay, assuming that the amount of time between receipt and retransmission at the base station is negligible;

(2) receive an indication from the base station as to how much time elapses between the receipt and retransmission of a signal received from the wireless communication device, from which the wireless communication system can calculate the one way delay; or (3) transmit the recorded round trip delay back to the base station, which then calculates the one way delay and transmits a value indicating the one way delay to the wireless communication device.

In accordance with one embodiment of the disclosed method and appartatus, round trip delay between the base station and the wireless communication device 20 is determined as the difference between the beginning of a frame on the signal that is transmitted from the base station, and the beginning of a frame on the signal that is received by the base station from the wireless communication device 20. This is known as the finger offset delay of the first arriving finger measured by the CSM (Cell site Modem). It should be noted that the round trip delay is the sum of the following:

(1) hardware delay of the forward link (base station transmission chain);

(2) one way propagation between the base station antenna and the antenna of the wireless communication device;

(3) hardware delay within the wireless communication device (receive and transmit chains); and (4) one way delay between the antenna of the wireless communication device and the base station antenna.

According to the telecommunications industry standard, IS-95, promulgated by the Telecommunication Industry Association/Electronics Industry Association (TIA/EIA), the wireless communication device should adjust its transmit timing to compensate for its own hardware delay such that the beginning of a frame of the signal transmitted by the wireless communication device 20 lines up with the beginning of the frame received by the wireless communication device 20. Accordingly, the hardware delay in item (3) is automatically removed to within an acceptable tolerance.

The delay in item (1) can be calibrated with accuracy of approximately 50 nano-seconds. Hence under line of sight conditions, an RTD measurement can be used to determine the distance between the wireless communication device 20 and the base station 10.

Figure 7:
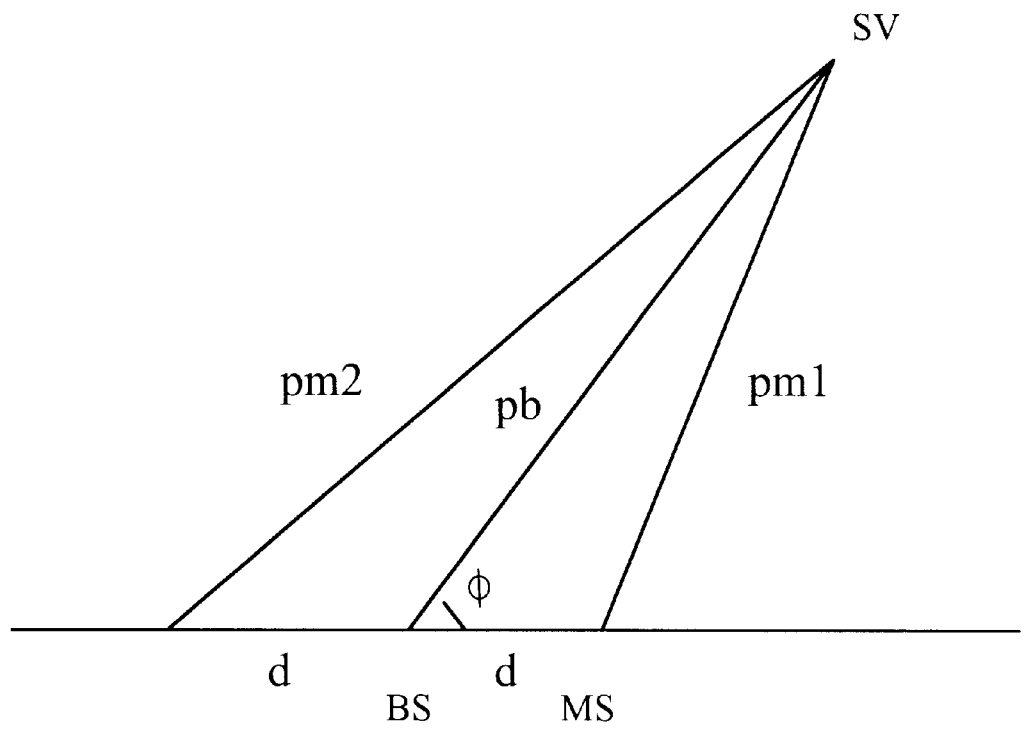
FIG. 7 shows the calculations of the search window size and center in the time domain.

Note that the GPS receiver 74 within the base station 10 is continuously tracking the satellites in view and hence can have up-to-date information on parameters related to the satellite. The BSC 14 will use the RTD, pseudo-range, satellite elevation angle, Doppler shift and rate of change of Doppler for each satellite to calculate the search window center and search window size in both time and frequency as follows (see also FIG. 7):

In the time domain the center of the search window for the $i^{th}$ space vehicle ("$SV_i$") is equal to the pseudo-range, ρb between the serving base station 10 and the $SV_i$ in FIG. 7. The search window size for $SV_i$ is equal to $d\cos(\phi_i)$, where d is equal to one half the round trip delay between the base station BS and the wireless communication device (noted as MS in FIG. 7) and, where $\cos(\phi_i)$ is the cosine of the angle of the elevation of the satellite with respect to the radius of the earth which originates at the center of the earth and passes through the receiver.

One skilled in the art will understand this relationship by noting that the distance between the base station and the satellite is much, much greater than the distance between the base station and the wireless communication device. Accordingly, when the satellite is essentially overhead, the distances ρm1, ρb, is and ρm2 will all be essentially equal. As the elevation angle of the satellite approaches 90 degrees, the difference between ρm1 and ρm2 will approach $2d$, and the search window size will approach d.

In accordance with one embodiment of the disclosed method and apparatus, the search window center and size can be further refined by information regarding:

(1) any information regarding the recent location of the wireless communication device, (2) information regarding from which, if any, other base stations the wireless communication device can receive signals, (3) the relative strength of signals received from other base stations, (4) the relative locations of other base stations from which additional signals can be received by the wireless communication device, (5) whether signals received by the wireless communication device are transmitted from a base station that is sectorized, and if so from which sector the signals are being transmitted, and (6) any attempt to triangulate the location of the wireless communication device using signals transmitted from any source, including any base stations, by either time of arrival or time difference of arrival information regarding such transmitted signals.

In the frequency domain, the search window center for $SV_i$ is equal to $f_o+f_{di}$; where $f_o$ is equal to the carrier frequency of the GPS signal and $f_{di}$ is equal to the Doppler shift of the signal transmitted by $SV_i$. The search window size for $SV_i$ is equal to the uncertainty in frequency due to receiver frequency error and Doppler rate of change. The BSC 14 sends the information including satellites in view, searcher window centers, sizes, in both time and frequency, and the minimum number of satellites needed to determine the position of the wireless communication device 20.

In accordance with one embodiment, a message to the wireless communication device 20 will trigger a re-tuning signal at the wireless communication device 20. The message also could have an "action time" (a particular time in the future when the receiver will retune to a GPS receiver frequency). In response, the wireless communication device 20 will activate the first and second switches 106 and 402 at the action time (FIG. 5) and thereby retune itself to the GPS frequency. The digital IF ASIC 400 changes its PN generator (not shown) to GPS mode and starts to search all specified satellites.

Once the wireless communication device 20 acquires the minimum number of the required satellites, it computes the pseudo-ranges based on the GPS clock within the wireless communication device 20, re-tunes to the communication system frequency, and sends the pseudo-range results along with the measured signal-to-noise ratio of the first three satellites and a most recent CDMA pilot search result to the BSC 14. The pilots search results are needed if the unit cannot acquire three satellites and there is no direct line of sight path between the serving base station and the wireless communication device 20. Nonetheless, less than three satellites can be used, as long the round trip delay from another device, such as another base station, can be computed using available information, such as pilots search information. Techniques for determining round trip delay based on pilot search information are well known in the art.

Figure 8:
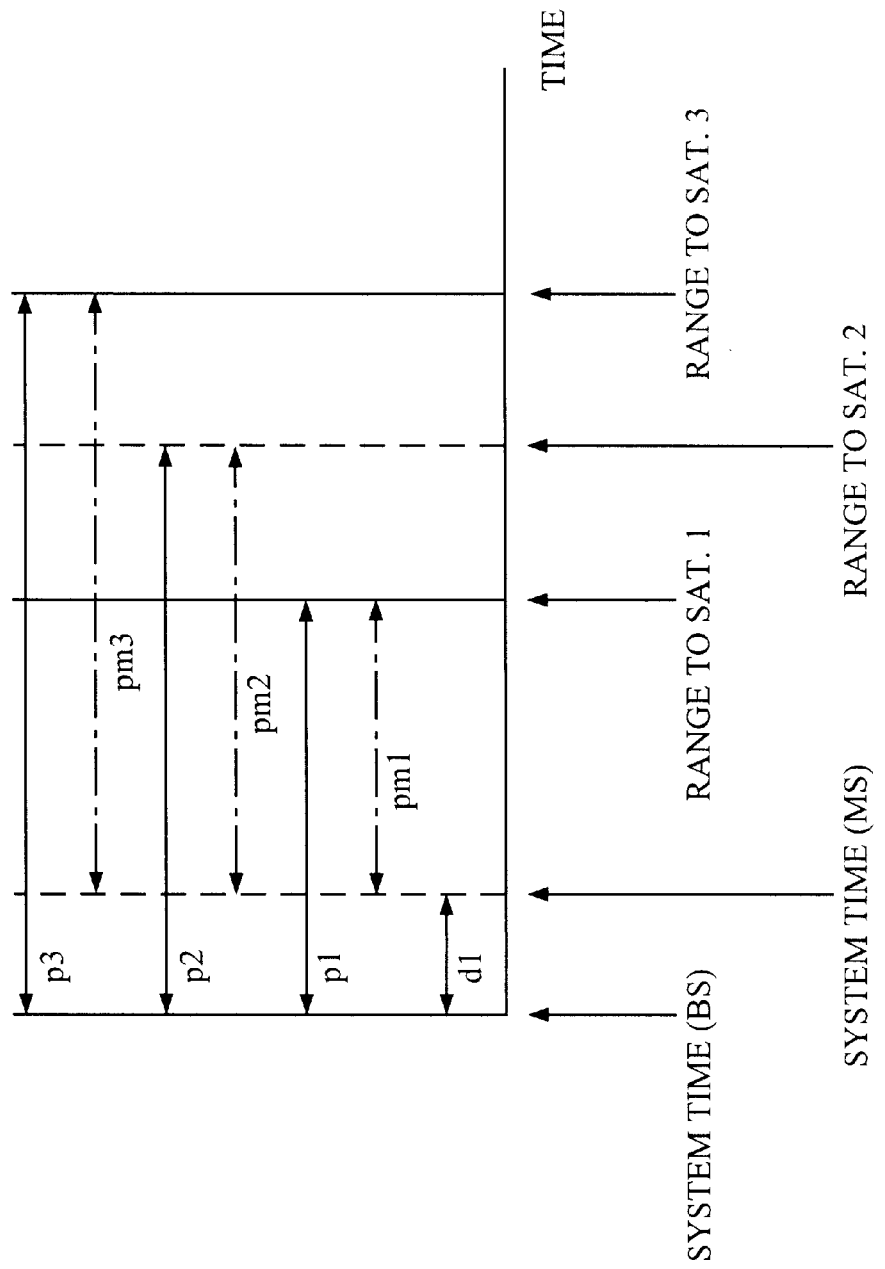
FIG. 8 is a diagram which illustrates correction of the local clock bias.

The BSC 14 sends the pseudo-range measurements made by the wireless communication device 20, together with the position of the serving base station 10, the corresponding round trip delay measurements, the position (in space) of the satellites under consideration (with reference to a fixed, predetermined reference origin), and differential GPS correction to the WPF 18 where the position of the wireless communication device 20 is calculated. The pseudo-ranges received from the wireless communication device 20 by the BSC 14 and passed to the WPF 18 are relative to the clock within the wireless communication device 20. Therefore, they are erroneous (i.e., biased by the round trip delay between the serving BTS 10 and the wireless communication device 20). FIG. 8 is a diagram that illustrates how the WPF 18 corrects for the local clock bias. In FIG. 8, δ1 represents the pseudo-range (half the round trip delay) in the receipt of signals transmitted from the base station 10 to the wireless communication device 20 and vice versa, rm1, rm2 and rm3 are the pseudo-ranges from the wireless communication device to the first, second and third selected GPS satellites 60, 70 and 80, respectively. These measurements are taken with respect to the local clock in the wireless communication device 20. But since the local clock is offset from the true GPS time by δ1, the corrected pseudo-ranges are then:

ρ1=ρm1+δ1
ρ2=ρm2+δ1
ρ3=ρm3+δ1

The WPF 18 uses the above three equation, position (in space) of the three satellites, position of the severing base station, and corresponding RTD measurements to calculate the position of the wireless communication device 20. Note that knowing the RTD is equivalent to exactly knowing the local clock bias of the wireless communication device relative to the true GPS time. That is, it is sufficient to solve the three range equations from the three satellites. Furthermore, if there is a direct propagation path between the base station and the wireless communication device, then three satellites provide an over-determined solution, since the RTD can be used to determine both the clock offset and a pseudo-range measurement to the base station.

Note also that the minimum number of satellites required can be reduced to two if there is a direct line of sight connection between the wireless communication device 20 and a base station 10, such that the distance between the wireless communication device 20 and the base station 10 can be determined directly from the RTD between the wireless communication device 20 and the base station 10. This number can be further reduced if information about other pilots (sites) is available. For example, if the wireless communication device 20 is in communication with two or more base stations (e.g., soft handoff), neither of which have a direct line of site to the wireless communication device 20, more than one round trip delay may be calculated, and hence two satellites are all that is needed to determine the position of the wireless communication device 20. That is, the calculations can be made based on the five equations (two equations related to the two pseudo range measurements associated with the two satellites, two equations related to the two base station RTD measurements, and one equation related to the RTD to the serving base station that allows the local clock within the wireless communication device 20 to be synchronized to true GPS time). This is very useful in scenarios where GPS satellites are blocked or shadowed by buildings of trees. In addition, it reduces the time to search for GPS satellites. The WPF 18 sends the calculated position to BSC 14 and the BSC 14 forwards the calculated position to MSC 12 or sends it directly to the wireless communication device 20.

In addition to using the RTD from another base station, the disclosed method and apparatus can use the time difference of arrival (TDOA) between pilots from different base stations or between a base station and a satellite to assist in determining the position of a wireless communication device. Such TDOA is used in addition to the TDOA of satellite signals from GPS satellites. Such use assists in determining the location of a wireless communication device when at least one synchronized base station is available (i.e., base station synchronized to GPS time) or at least two unsynchronized base stations (i.e., base stations synchronized to one another, but not to GPS time) and less than the desired number of satellites are available. Use of TDOA measurements from forward link signals can reduce the number of satellites even in the absence of RTD information.

The following is a description of several embodiments of the presently disclosed method and apparatus for using forward link information to assist in determining the position of a wireless communication device. It should be understood that the apparatus disclosed is essentially a general purpose processor, digital signal processor, dedicated circuit, state machine, ASIC, or other such circuitry that can perform the function disclosed, as is well known in the art.

In order to determine the position of the wireless communication device, the number of unknowns (e.g., x, y, and z coordinates of the device and exact time) must match the number of equations that include those unknowns. The following equation can be written for each pair of signals from which a TDOA measurement can be made (i.e., each pair comprising one signal transmitted by a first base station BS1 and one signal from transmitted by a second base station BS2):

$$TDOA_{bs1, bs2, wcd} = \Delta t + \left( \sqrt{(x_{bs1} - x_{wcd})^2 + (y_{bs1} - y_{wcd})^2 + (z_{bs1} - z_{wcd})^2} - \sqrt{(x_{bs2} - x_{wcd})^2 + (y_{bs2} - y_{wcd})^2 + (z_{bs2} - z_{wcd})^2} \right) / c$$

wherein $TDOA_{bs1, bs2, wcd}$ is the TDOA between signals received by the wireless communication device (wcd), from a first base station (bs1), and a second base station (bs2);

$\Delta t$ is the offset between the clock used to generate the signals transmitted by each signal source and any difference between the internal BS delay of base stations bs1 and bs2

$x_{bs1}$ is the x coordinate determining the location of base station bs1;

$x_{bs2}$ is the x coordinate determining the location of base station bs2;

$y_{bs1}$ is the y coordinate determining the location of base station bs1;

$y_{bs2}$ is the y coordinate determining the location of base station bs2;

$z_{bs1}$ is the z coordinate determining the location of base station bs1;

$z_{bs1}$ is the z coordinate determining the location of base station bs2;

$x_{wcd}$ is the x coordinate determining the location of wireless communication device; $y_{wcd}$ is the y coordinate determining the location of wireless communication device; and $z_{wcd}$ is the z coordinate determining the location of wireless communication device.

For the above equation, the unknowns are the x, y, z of the wireless communication device and $\Delta t$. Similar equations can be written for the satellite TDOA measurements. Since there are four unknowns, there must be four such equations, requiring at least four satellites or base stations in any combination, assuming the $\Delta t$ is constant for both the satellites and the base stations. If this assumption is not true (i.e., the base stations are not synchronized to GPS time), then one additional unknown will be added, and so one additional signal source is required. In addition, if the base stations and GPS system are not synchronized, then there must be at least two satellites and at least two base stations in order to use both satellites and base stations.

If communication base stations operate synchronously with respect to one another, the TDOA of each pilot with respect to each other pilot can be determined using the above equation. If the base stations are also synchronized to GPS time, as is the case with CDMA communication base stations, the method of using forward link pilot TDOA and satellite TDOA which are both synchronized to GPS time is referred to herein as a "synchronous GPS/forward link mode".

In the case in which the communication base stations are not synchronized to GPS time, the method of using both forward link TDOA and satellite TDOA is referred to herein as an "asynchronous GPS/forward link mode". In this case, the term "asynchronous" refers to the fact that there is an unknown offset between the time reference used to make time of arrival measurements on the forward link and the time reference used to make time of arrival measurements on the GPS satellite signals. It should be understood that the term "asynchronous" is not intended to convey that the base stations are not synchronized with one another, nor that the GPS satellites are not synchronous with one another. In fact, each base station is preferably synchronized with each other base station to allow the time difference of arrival of each signal received from a base station to be determined with respect to each other base station. Likewise, each satellite is synchronized with each other satellite in the GPS constellation.

Referring to FIGS. A–D, the timing between pilot PN sequences that are generated and transmitted by the three base stations 10a, 10b, 10c are discussed. It should be noted that while the presently disclosed method and apparatus is described essentially with respect to a CDMA system, the asynchronous GPS/forward link mode is most useful when used with synchronous communications systems that are unrelated to GPS time, such as time division multiple access (TDMA) communication systems.

Synchronous GPS/forward Link Mode

Figure 9:
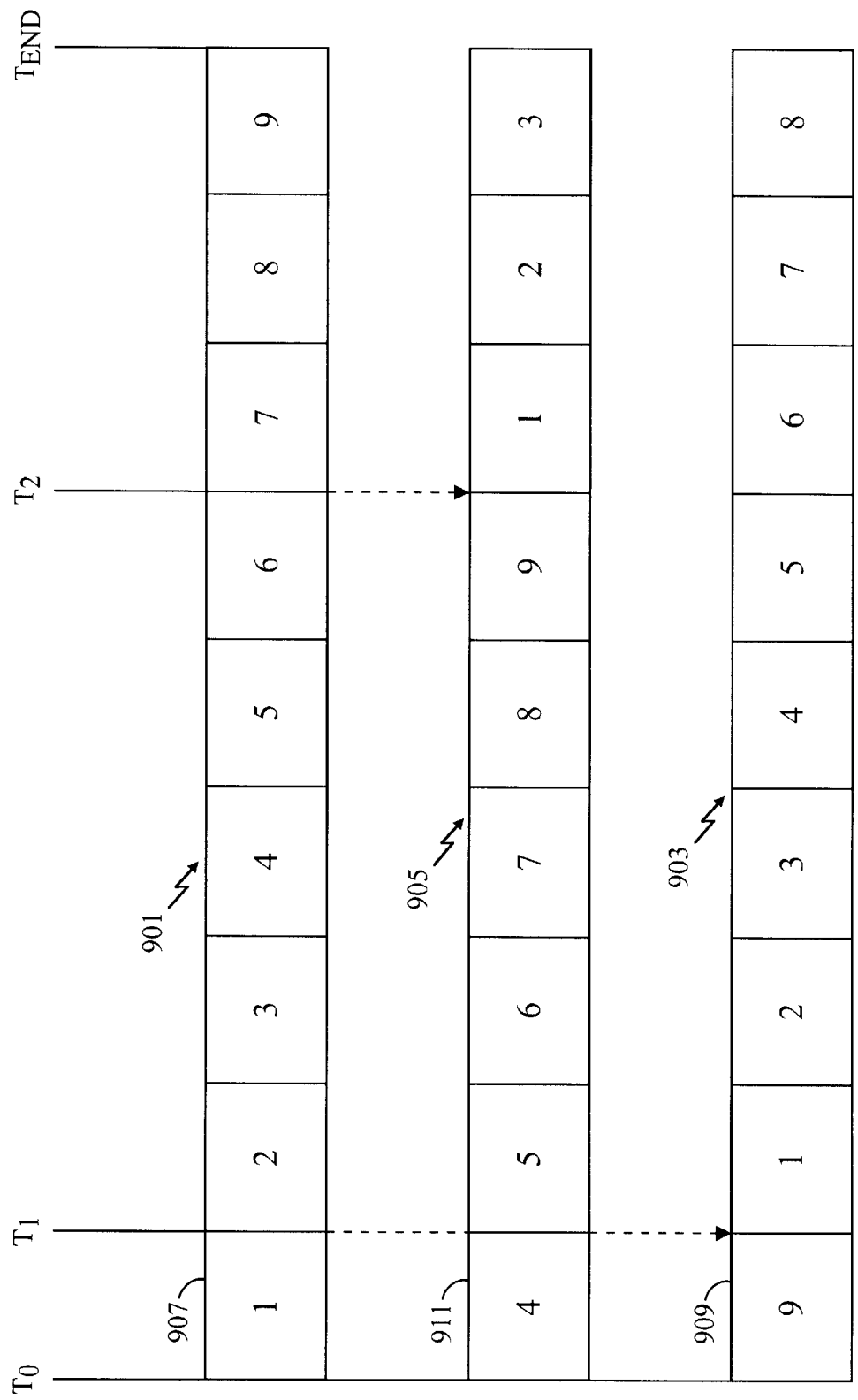
FIG. 9 illustrates the relationship between the pilot PN sequences that are transmitted from three base stations.

FIG. 9 illustrates the relationship between the pilot PN sequences that are transmitted from three base stations. FIG. 9 shows three pilot PN sequences 901, 903,905, each pilot PN sequence having nine chips numbered one through nine. A "chip" is defined herein as the smallest unit of information within a pseudo-random noise (PN) sequence. Each chip will typically have a binary (or logical) value (i.e., either one or zero).

A pilot PN sequence is defined for the purposes of this disclosure as a sequence having a length N, which repeats every N chips (in the illustrated example N=9 chips), but which appears to be random in any sequence of N consecutive chips. It should be understood by those skilled in the art that the pilot PN sequences that are transmitted by CDMA base stations are typically on the order of $2^{15}$ chips in length. However, for the sake of simplicity and clarity in describing the present method and apparatus, the pilot PN sequences shown in FIG. 9 are shown to be only nine chips in length.

FIG. 9 shows the timing of three pilot PN sequences 901, 903, 905 generated by the control processors 62 of three base stations 10a, 10b, 10c. Each base station 10 generates one such pilot PN sequence. Each base station 10 within a CDMA communication system transmits the same pilot PN sequence. However, the beginning of the pilot PN sequence generated by each base station 10b, 10c is intentionally offset a predetermined amount of time by the control processor 62. For the purposes of this discussion, the control processor 62 within the base station 10a transmits a "zero PN sequence". The zero PN sequence is the reference from which each other pilot PN sequence is offset. Accordingly, the control processor 62 that generates the zero PN sequence introduces an offset of zero (hence the name "zero PN sequence"). It should also be noted that the presently disclosed method and apparatus does not need the zero PN sequence to be generated by any particular base station. The zero PN sequence is shown merely for illustrative purposes. It will be understood by those skilled in the art that in conventional CDMA communication systems there is a one to one correspondence between each pilot PN sequence offset and each base station. That is, each base station is assigned a unique offset and generates pilot PN sequences with that one offset only.

The offset intentionally introduced by the control processor 62 of each base station 10b, 10c preferably has a duration that is equal to the amount of time required to transmit an integer number of chips. The offset is unique to each base station in the communication system. In the example shown in FIG. 9, the zero PN sequence 901 is generated within the control processor 62 of the base station 10a beginning at a time $T_0$ and repeating beginning at a time $T_{end}$. In a CDMA communication system, times $T_0$ and $T_{end}$ are predetermined times with respect to GPS time. Since, the pilot PN sequence is a fixed length and repeats, the beginning of the pilot PN sequence will occur on regular predictable intervals with respect to GPS time. The first such pilot PN sequence 901 is the zero PN sequence that is used as a timing reference. The second such pilot PN sequence 903 begins at time $T_1$ and is offset from the zero PN sequence by eight chips. Accordingly, when the base station 10a generating the zero PN sequence 901 is generating the first chip 907 of the pilot PN sequence 903, base station 10b generating the pilot PN sequence 903 is generating the ninth chip 909. The pilot PN sequence 905 begins at time $T_2$ and is offset from the zero PN sequence by three chips. Therefore, when the zero PN sequence is generating the first chip 907, the base station generating the pilot PN sequence 905 is generating the fourth chip 911. Each base station is synchronized to base station time. Therefore, each base station in the system can generate the offset pilot PN sequences synchronously with respect to each other base station in the system. It can be seen that, even without knowing the time at which the zero sequence begins, the offset between the pilot PN sequence 903 and the pilot PN sequence 905 at the time each signal was generated can be determined to be four chips.

It will be understood by those skilled in the art that true GPS time can be attained within any base station having a GPS receiver and processor by calculating a complete solution for the location of the base station from GPS signals received from four satellites. Such a complete solution will yield the coordinates x, y, and z, of the receiving base station 10a and GPS time t, as is well known in the art. More generally, true GPS time can be determined accurately by calculating an N dimensional solution for location using N+1 satellites. Accordingly, the base station 10a will cause the zero PN sequence 901 to begin at a particular time with respect to true GPS time.

It should be noted that the absolute time at which the zero PN sequence begins need not be known, since the time difference of arrival between two signals received at the wireless communication device is determined as a relative measurement. Once a wireless communication device determines that a pilot signal that is being transmitted from a base station can be received, the receiver can then demodulate information transmitted on a "sync" signal transmitted from the same base station. The information demodulated on the sync signal includes the PN offset (with respect to the zero PN sequence) that was applied to the pilot PN sequence. Therefore, the zero PN sequence serves as a reference for determining the relative timing of each of the pilot PN sequences transmitted by each base station within a CDMA communications system.

However, even though the control processor 62 within each CDMA base station 10 is synchronized to GPS time, there is a propagation delay associated with transmitting each pilot PN sequence 901 to the center of radiation of the transmit antenna 43 within the communication antennas 201 of the transmitting base station 10. This hardware delay through the transmission chain (hereafter referred to as "internal BS delay") introduces an offset between the time at which the pilot PN sequence began with respect to true GPS time (i.e., the beginning of the pilot PN sequence at the control processor 62) and the beginning of the pilot PN sequence at the time of transmission from the center of radiation of the antenna 43. The internal BS delay may be different for each base station 10. Accordingly, CDMA base stations are not accurately synchronized to GPS time, or to each other, at the center of radiation of the base station transmit antennas 43. This inaccuracy is not significant enough to be problematic for communications, but does present a problem when attempting to very accurately determine the time difference of arrival for the purpose of determining position location.

Figure 10:
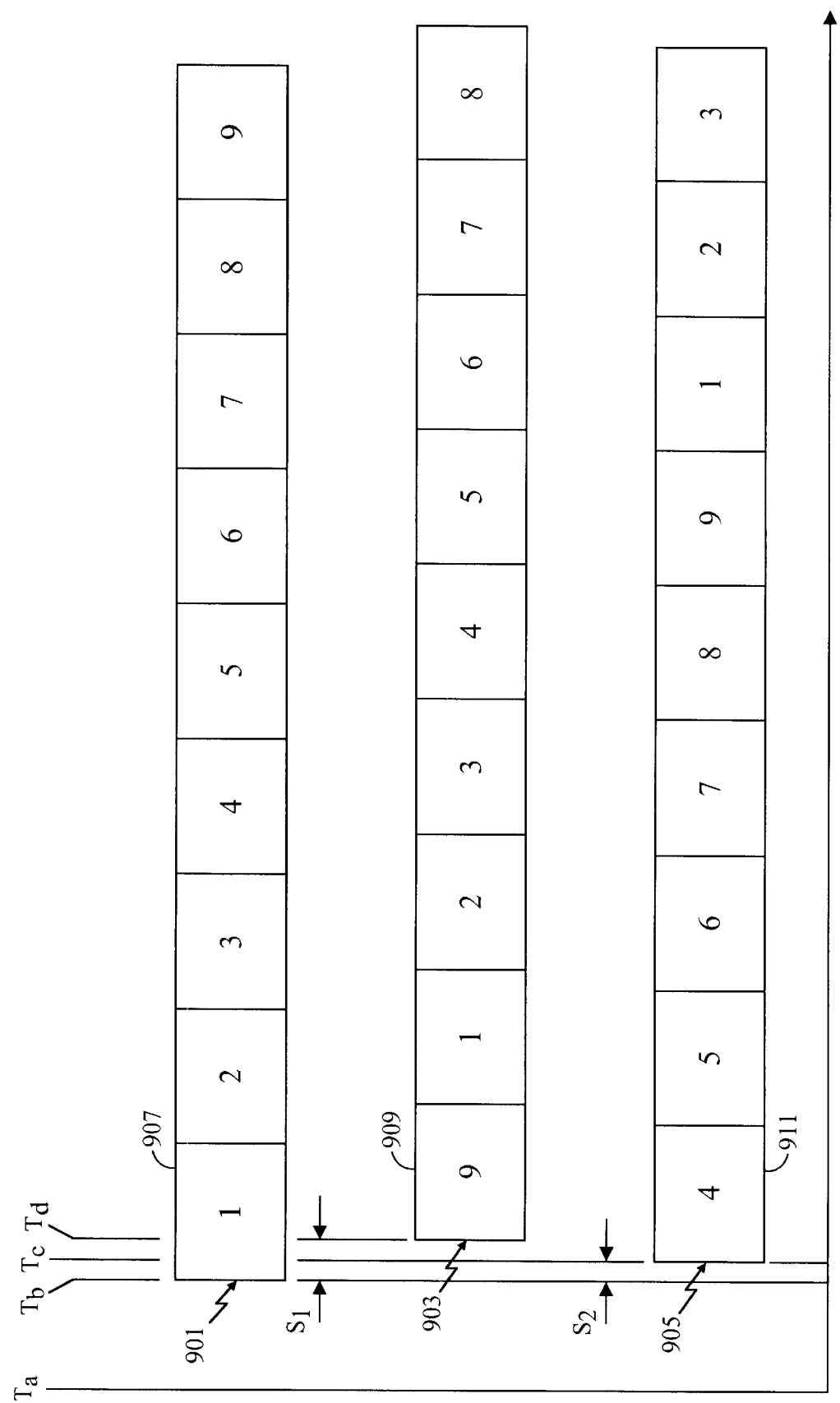
FIG. 10 illustrates the relationship between the pilot PN sequences that are transmitted from three base stations.

FIG. 10 illustrates the effect on the relative timing of the pilot PN sequences 901, 903, 905, caused by the internal BS delay. The first pilot PN sequence 901 is delayed from time $T_a$ to time $T_b$. Likewise, the pilot PN sequence 903 is delayed from time $T_a$ to time $T_d$. Pilot PN sequence 905 is delayed from time $T_a$ to time $T_c$. It can be seen in FIG. 10 that the pilot PN sequences 903 and 905 have been shifted by an amount of time $S_1=T_b-T_d$ and $S_2=T_b-T_c$, respectively, with respect to the pilot PN sequence 901, due to the differences in the internal BS delays through each base station 10. The relative offsets $S_1$, $S_2$ must be known in order to accurately determine the TDOA of the three pilot signals 209, 211, 213 received from the three base station 10 at the wireless communication device 20.

Neither the internal BS delay of each base station 10, nor the relative offset S will typically vary greatly over time. Accordingly, in one embodiment of the presently disclosed method and apparatus, either the internal BS delay of each base station 10 or the relative offset S can be measured at the time a base station is commissioned. Alternatively, the internal BS delay or relative offset S can be determined at regular intervals and communicated to the wireless communication device. In yet another embodiment, the internal BS delay or relative offset S can be continuously determined and communicated to the wireless communication device, either upon demand, at regular intervals, or in response to a change in the value.

Figure 11:
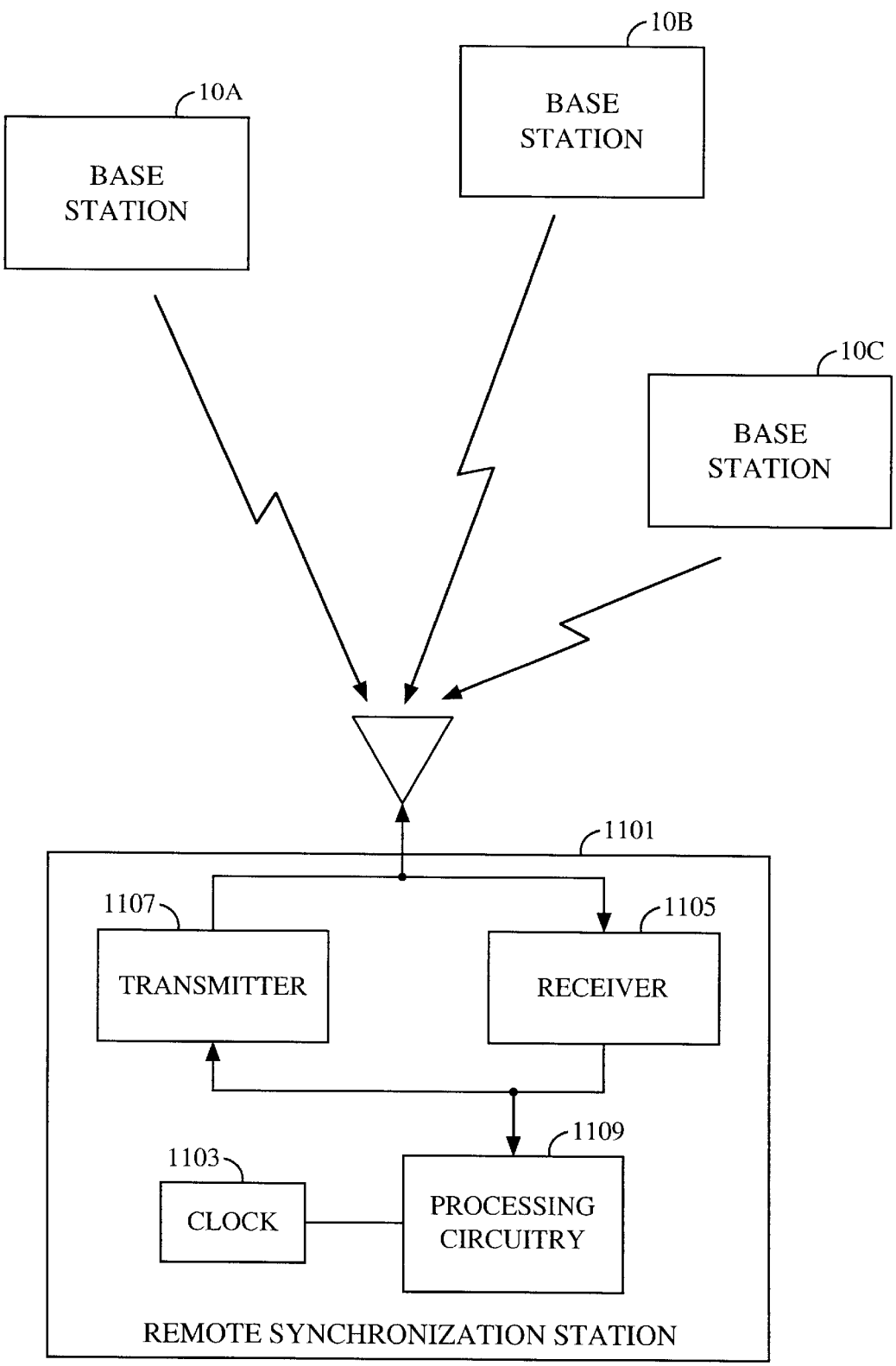
FIG. 11 shows a simplified block diagram of such a remote synchronizing station located a known distance away from a plurality of base stations.

One method for measuring the internal BS delay and the relative offset among CDMA base stations (or base stations from any other system that is synchronized to GPS time) is to use a remote synchronizing station located a known distance away (i.e., having a known propagation delay from the antenna of the base station 10 to the remote synchronizing station) to receive a pilot PN sequence from the base station 10. FIG. 11 shows a simplified block diagram of such a remote synchronizing station 1101 located a known distance away from a plurality of base stations 10a, 10b, 10c. The remote synchronizing station 1101 comprises a clock 1103, a receiver 1105, a transmitter 1107, and processing circuitry 1109. Since the distances between base stations 10a, 10b, 10c and the remote synchronizing station 1101 are fixed, such a remote synchronizing station capable of receiving signals from more than one base station and operating at a known location can be used to determine the offset between base stations. Since the time difference of arrival for signals coming from sources at known locations can be easily determined for a remote synchronizing station 1101 at a known location, the remote synchronizing station 1101 can determine the difference between the expected time difference of arrival and the measured time difference of arrival.

Alternatively, if the remote synchronizing station 1101 has a GPS receiver, it can determine the amount of delay introduced as follows. The base station can determine true GPS time from the GPS receiver. The base station can also determine the time at which the signal was generated at the control processor 62 within the base station 10, since the base station will generate the pilot PN sequence at a predetermined time with respect to true GPS time.

Figure 12:
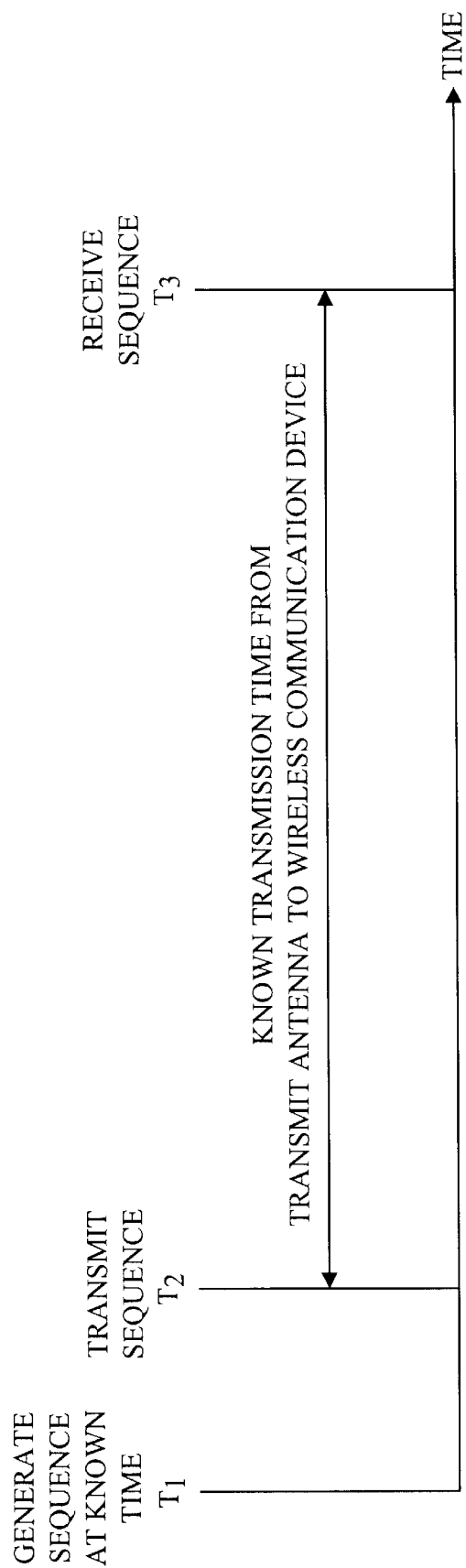
FIG. 12 is an illustration of the method used to determine the amount of delay introduced between a base station control processor and center of radiation of the transmit antenna using a remote synchronizing station at a known distance or to which signals can be transmitted with a known transmission delay.

FIG. 12 is an illustration of the method used to determine the amount of delay introduced between a base station control processor 62 and center of radiation of the transmit antenna 43 using a remote synchronizing station 1101 at a known distance or to which signals can be transmitted with a known transmission delay. As shown, a pilot PN sequence is generated at a first time $t_1$. The pilot PN sequence is communicated through the base station to the center of radiation of the transmit antenna 43 and begins transmission at time $t_2$. The pilot PN sequence is then transmitted over the air to the remote synchronizing station, where it is received at time $t_3$. Accordingly, since both time $t_1$ and time $t_3$ are known with respect to true GPS time, the amount of time required for the pilot PN sequence to propagate from the control processor 62 to the remote synchronizing station 1101 is known. In addition, the amount of time required for the signal to propagate from the transmit antenna 62 to the remote synchronizing station 1101 (i.e., the difference between time $t_2$ and $t_3$) is know, since the distance and/or path traversed by the signal can be measured and determined.

One way to determine the difference between time $t_2$ and $t_3$ is to measure the round trip delay. For example, a wireless communication device that receives the signal may be a conventional wireless mobile phone adapted to provide the round trip delay between the base station 10 and the phone. Alternatively, the base station 10 may be a conventional base station having the ability to determine the round trip delay between the base station 10 and the wireless communication device 20. It will be understood by those skilled in the art that these are several ways to determine the propagation delay that occurs between the base station 10 and the wireless communication device. Several other well know techniques could be used to perform this measurement. It will also be understood by those skilled in the art that the remote synchronizing station 1101 may be a conventional wireless telephone, a piece of test equipment specially designed to perform the synchronization function, or any other receiver, such as another base station, capable of being adapted to perform the functions described herein.

Once these values are know, the difference in time from $t_1$ to $t_2$ can be calculated by subtracting the amount of time between time $t_2$ and $t_3$ from the amount of time between $t_1$ and $t_3$ resulting in the time between $t_1$ and $t_2$.

Figure 13:
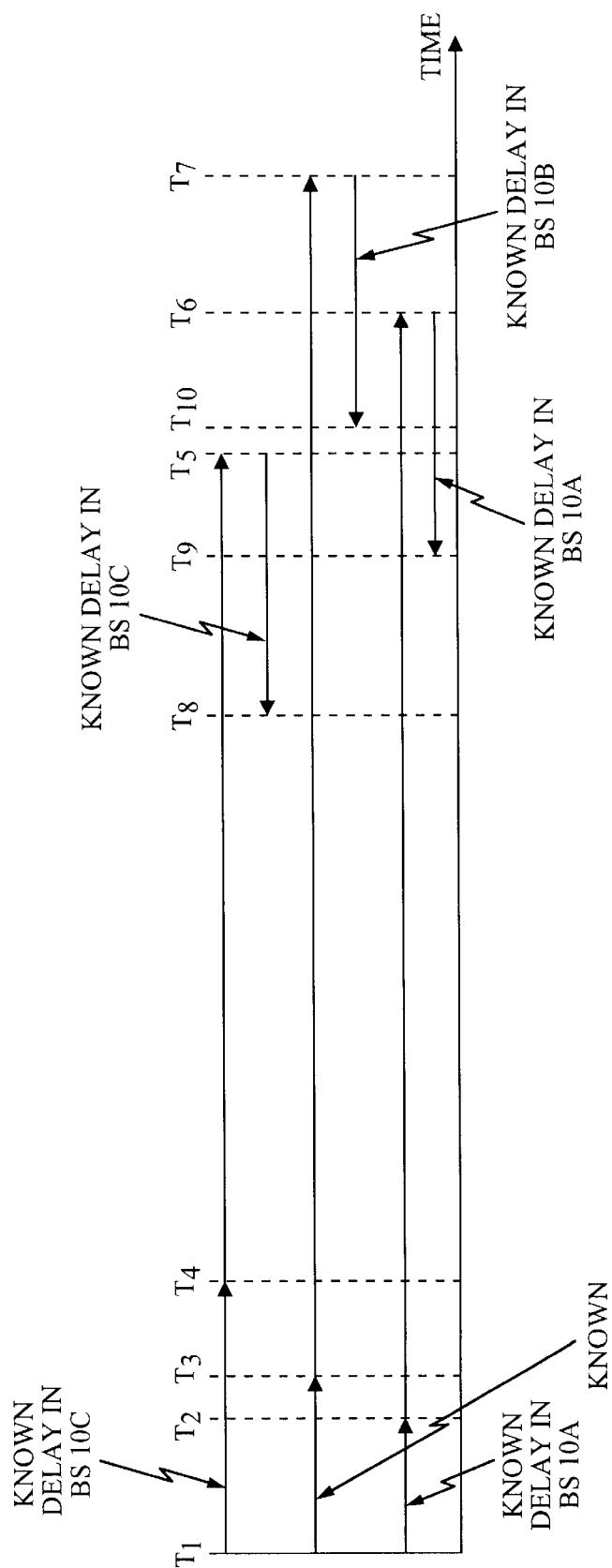
FIG. 13 illustrates the method by which the TDOA for base stations is calculated in accordance with the synchronous GPS/forward link mode.

FIG. 13 illustrates the method by which the TDOA for base stations is calculated in accordance with the synchronous GPS/forward link mode. As shown in FIG. 13, each of three base stations 10a, 10b, 10c generates a pilot PN sequence at the same time $T_1$. However, each base station 10a, 10b, 10c has a different internal BS delay. Accordingly, the first base station 10a transmits the pilot PN sequence generated in that base station 10a at time $T_2$, the second base station 10b transmits the pilot PN sequence generated by that base station 10b at time $T_3$, and the third base station 10c transmits the pilot PN sequence generated by that base station 10c at time $T_4$. The internal BS delays within each base station 10 can be determined as described above. Once determined, the internal BS delays can then be either stored in, or communicated to, the wireless communication device.

Once the three pilot PN sequences are transmitted, each by an associated one of the base stations 10, each pilot PN sequence will encounter a different propagation delay through the air from the center of radiation of the transmit antenna 43 of the transmitting base station 10 to the receiving wireless communication device 20. It can be seen that the TDOA between the base station 10a and 10b, for example, appears to be the difference between times $T_6$ and $T_7$. However, since the time difference of arrival should measure only the difference in the amount of time required for the signal to propagate through the air, the error introduced by the differences in the internal BS delays encountered in communicating the pilot PN sequences from the control processor 62 to the center of radiation of the transmit antenna 43 must be taken into account. This can be done by simply subtracting the known internal BS delays from the times $T_5$, $T_6$, and $T_7$, resulting in the times $T_8$, $T_9$, and $T_{10}$. Accordingly, the corrected TDOA is the difference between each pair of these three times $T_8$, $T_9$, and $T_{10}$. In addition, subtracting the internal BS delays synchronizes each of the base stations with GPS time. Therefore, since each GPS satellite is synchronized with GPS time, the time of arrival of the base station signals and the time of arrival of the satellite signals can be used together to form a TDOA value that can be used in a least mean square TDOA equation, as is well known in the art. It will be understood by those skilled in the art since the satellite signals and the base station signals are synchronized, the relationship between the pilot PN sequence that is transmitted from the base stations and the satellites is known. Accordingly, without knowing the exact time at which the signals were transmitted from either the base stations or the satellites, the time at which the base station signals were transmitted with respect to the time at which the satellite signals were transmitted is known. Therefore, the time difference of arrival can be accurately determined by subtracting the arrival times of any signal from either a base station or satellite from any other signal received from either a base station or satellite.

Asynchronous GPS/forward Link Mode

As is the case in the synchronous GPS/forward link mode, the asynchronous GPS/forward link mode assumes that all base stations are synchronized to one another. However, in the asynchronous mode, the time of arrival of signals received over the forward link cannot be combined with the time of arrival of the GPS signals to generate meaningful TDOA measurements, as can be done in the synchronous GPS/forward link mode. Rather, the time of arrival of signals received from base stations can be combined with only the time of arrival of signals received from other base stations to form TDOA measurements. Likewise, the time of arrival of signals received from GPS satellites can be combined with only the time of arrival of signals received from other satellites to form TDOA measurements.

Nonetheless, if a wireless communication device can receive signals from N base stations (where N is equal to at least two), then all that is needed are signals from 4–N–1 satellites. Any additional satellites that can be received would provide an over-determined solution, thus leading to a more reliable and accurate solution. It should also be clear from the present disclosure to those skilled in the art that two or more non-synchronous systems may be combined in order to reduce the number of satellites needed to $4-(N_1-N_2\ldots-N_x)-X$, where there are X systems in addition to the satellite system, each such system having at least one base station that can be received by the wireless communication device, and N base stations can be received for system x.

In addition, the procedure for determining the differences between internal BS delays in the asynchronous GPS/forward link mode differs from the procedure used in the synchronous GPS/forward link mode due to the fact that the base stations are not synchronized to GPS time. In the case of asynchronous GPS/forward link mode, a receiver receives signals from at least two of the base stations within the communication system. The receiver is placed in a known location so that the TDOA between the signals transmitted from each pair of two base station is known. Accordingly, the difference between the known value of the TDOA and the measured value of TDOA is equal to the difference in the internal BS delays (and any clock offsets between the base stations). For each pair of base stations, such a measurement is made. These differences are then either stored in, or communicated to, the wireless communication device 20 to be taken into account when calculating the TDOA values. Alternatively, these differences can be either stored in, or communicated to the WPF 18 to which the TDOA measurements from the wireless communication device 20 will be sent. In that case, the WPF 18 corrects the TDOA to account for errors in the synchronization between the base stations. If the calculated values are communicated, they may be communicated at the time a new base station is commissioned, at regular intervals, on demand, or upon a change in the values.

The GPS/forward link modes described herein treat each base station as a "pseudo satellite". A pseudo satellite is defined as a device that transmits a signal synchronous with the satellites and which can be used in a TDOA measurement with a satellite. The WPF 18 stores base station almanac, including base station location, antenna high, antenna characteristics (antenna pattern and gain), base station configuration, such as number of sectors, orientation of sectors, clock error for each sector. In this way, the location system will consider all received signals by the wireless communication device to have one common time reference (i.e., GPS time as the reference for all received signals). It should be noted that the presently disclosed method and apparatus may use both forward and reverse link measurements if they are available. That is, similar measurements made at a plurality of base stations based on signals transmitted by the wireless communication device could be used instead of, or in addition to, the signals received by the wireless communication device. The same technique would apply. However, the time of arrival information would have to be transmitted to a common location so that differences in the relative arrival times at each base station of the signal transmitted from the wireless communication device could be determined.

The disclosed method and apparatus has been described herein with reference to a particular embodiment for a particular application. Those having ordinary skill in the art and access to the present teachings will recognize additional modifications, applications, and embodiments within the scope of the present invention. It is therefore intended by the appended claims to cover any and all such applications, modifications, and embodiments within the scope of the present invention.

What is claimed is:

1. A wireless communication device for determining the search window center for searching for a global positioning system (GPS) satellite, including:

a) a receiver for receiving signals from a base station, the signals including an indication of the timing of a GPS satellite;

b) a GPS receiver/time unit; and c) a control processor, coupled to the receiver and to the GPS receiver/time unit, and configured to use the received timing of the GPS satellite to determine a search window center in time to expedite a search for that satellite;

wherein the search window center is further determined using the particular sector within the base station through which the base station is communicating with the wireless communication device.

2. A wireless communication device for determining the search window center for searching for a global positioning system (GPS) satellite, including:

a) a receiver for receiving signals from a base station, the signals including an indication of the timing of a GPS satellite;

b) a GPS receiver/time unit; and c) a control processor, coupled to the receiver and to the GPS receiver/time unit, and configured to use the received timing of the GPS satellite to determine a search window center in time to expedite a search for that satellite;

wherein the search window center is further determined using the strength with which signals from other base stations are received by the wireless communication device.

3. A wireless communication device for determining the search window center for searching for a global positioning system (GPS) satellite, including:
   a) a receiver for receiving signals from a base station, the signals including an indication of the timing of a GPS satellite;
   b) a GPS receiver/time unit; and
   c) a control processor, coupled to the receiver and to the GPS receiver/time unit, and configured to use the received timing of the GPS satellite to determine a search window center in time to expedite a search for that satellite;
      wherein the search window center is further based upon differences in arrival times at the wireless communication device between signals transmitted from at least two base stations.

4. A wireless communication device for determining the search window center for searching for a global positioning system (GPS) satellite, including:
   a) a receiver for receiving signals from a base station, the signals including an indication of the timing of a GPS satellite;
   b) a GPS receiver/time unit; and
   c) a control processor, coupled to the receiver and to the GPS receiver/time unit, and configured to use the received timing of the GPS satellite to determine a search window center in time to expedite a search for that satellite;
      wherein the search window center is further based upon prior knowledge of where the wireless communication device has recently been.

* * * * *